(12) United States Patent
Pirogov et al.

(10) Patent No.: US 11,899,882 B2
(45) Date of Patent: Feb. 13, 2024

(54) QUADRATURE CALIBRATION METHODS FOR SENSOR APPLICATIONS

(71) Applicant: Cypress Semiconductor Corporation, San Jose, CA (US)

(72) Inventors: Oleksandr Pirogov, Lviv (UA); Viktor Kremin, Lviv (UA); Jens Weber, Pinneberg (DE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/531,203

(22) Filed: Nov. 19, 2021

(65) Prior Publication Data

US 2023/0161439 A1 May 25, 2023

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04107* (2013.01)

(58) Field of Classification Search
CPC ................... G06F 3/0418; G06F 3/044; G06F 2203/04107

USPC .................................................. 345/173–178
See application file for complete search history.

(56) References Cited

U.S. PATENT DOCUMENTS

| | | | | |
|---|---|---|---|---|
| 8,564,565 B2* | 10/2013 | Westhues | ............ | G06F 3/04184 345/173 |
| 2014/0292375 A1* | 10/2014 | Angelini | .................. | G03G 7/00 327/94 |
| 2014/0327644 A1* | 11/2014 | Mohindra | ................ | G06F 3/044 345/174 |
| 2018/0004317 A1* | 1/2018 | Bohannon | ........... | G06F 3/04182 |
| 2019/0042032 A1* | 2/2019 | Moseley | ................ | G06F 3/0446 |
| 2022/0043531 A1* | 2/2022 | Tang | .................... | G06F 3/04182 |

* cited by examiner

*Primary Examiner* — Kwin Xie

(57) ABSTRACT

Apparatuses and methods of quadrature modulation and compensation are described. One touch controller includes a receiver sensing channel to measure a sense signal and generate at least four samples per one period of the sense signal. The touch controller includes quadrature demodulation logic to determine phase information of the sense signal using the at least four samples per one period of the sense signal and processing logic to execute a compensation algorithm to compensate for a phase mismatch of the touch controller based on the phase information.

20 Claims, 18 Drawing Sheets

QUADRATURE CALIBRATION METHODS FOR SENSOR APPLICATIONS

TECHNICAL FIELD

The present disclosure generally relates to sensing systems, particularly capacitance-sensing systems configurable to measure or convert capacitance to digital values representative of the capacitance.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs, and other similar mechanical user interface controls. The use of a capacitive sense element eliminates complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Arrays of capacitive sense elements work by measuring the capacitance of a capacitive sense element's capacitance and looking for a delta (change) in capacitance indicating a touch or presence of a conductive object. When a conductive object (e.g., a finger, a hand, or other objects) comes into contact with or close proximity to a capacitive sense element, the capacitance changes, and the conductive object is detected. An electrical circuit can measure the capacitance changes of the capacitive touch sense elements, and the electrical circuit converts the measured capacitances of the capacitive sense elements into digital values.

There are two typical types of capacitance: 1) mutual capacitance where the capacitance-sensing circuit is coupled to both electrodes and a drive/receive configuration to measure the capacitance between the electrodes; 2) self-capacitance, where the capacitance-sensing circuit is coupled to a single electrode of the capacitor where the second electrode is tied to a direct current (DC) voltage level or is parasitically coupled to Earth Ground. A touch panel has a distributed load of the capacitance of both types 1) and 2), and some touch solutions sense both capacitances either uniquely or in hybrid form with its various sense modes.

DETAILED DESCRIPTION

Figure 1:
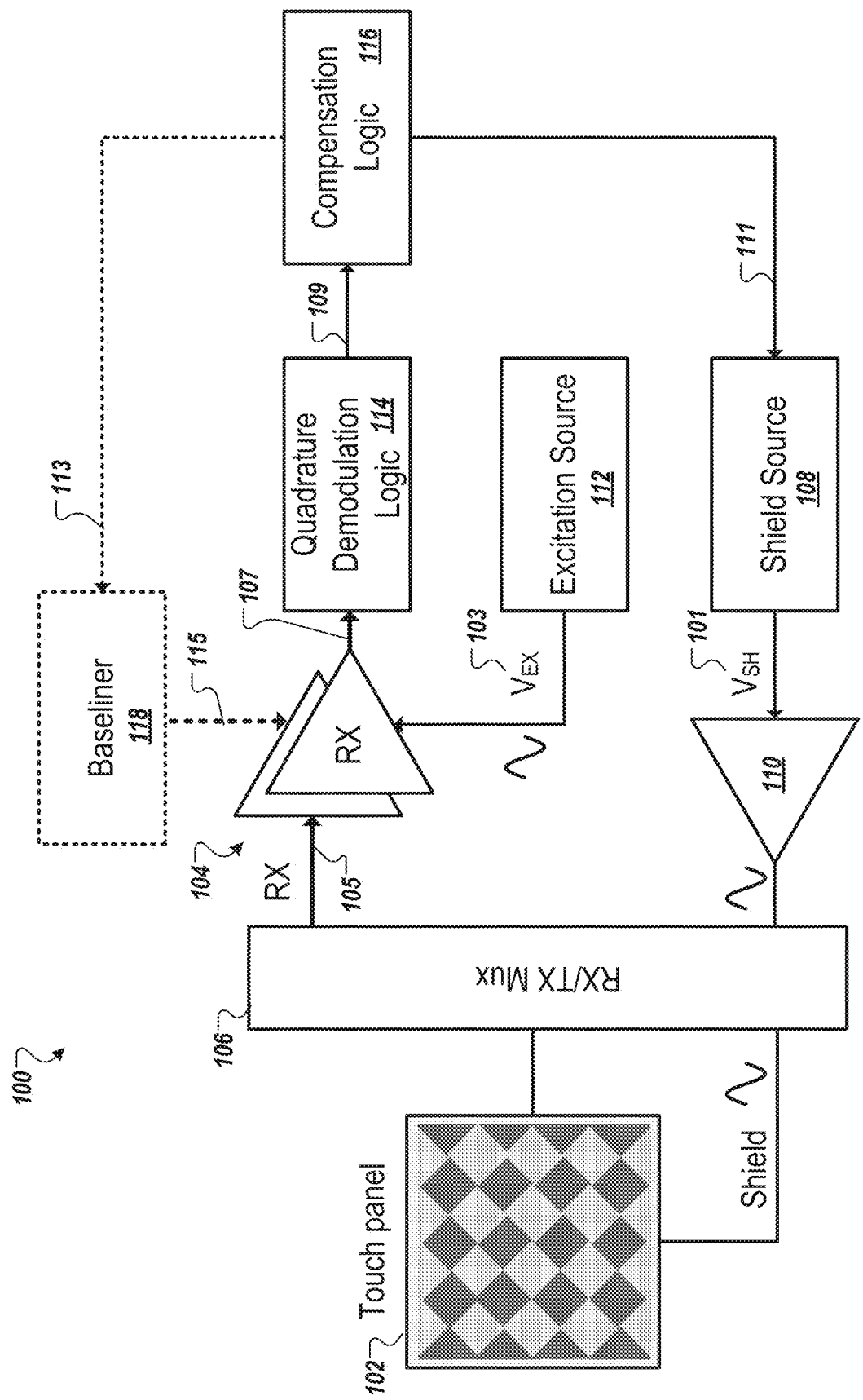
FIG. 1 is a block diagram of a touch controller with quadrature demodulation according to at least one embodiment.

Sensing systems can use shielded, open-field capacitive sensors (e.g., proximity, large touch panels, or the like) to measure touches. The shielded capacitive sensors need to use sinusoidal signals for excitation and shield signals to keep radiated emissions low for various customer requirements. The sensor excitation circuit and shield driver can have different phase delays and gain variances, resulting in the potential phase and amplitude misalignments between excitation and shielding signals. A shielded capacitive sensor is very sensitive to excitation-shielding signal phase mismatch due to high coupling capacitance between sensor and shield electrode. For typical operation conditions, a 1-2° phase mismatch between a receiver (RX) sensing channel and a shield signal may change a phase of an RX input current by 70-80° and significantly increase its amplitude. For example, a baseline current can increase about 5 times.

Thus, a sensor controller has to minimize the phase mismatch in order to operate with a minimum baseline input signal (i.e., to minimize the capacitive load of the RX sensing channel). Since the phase mismatch can be introduced due to temperature variation, the touch controller needs to calibrate the system in run-time, spending a minimum amount of time.

One existing solution is for the touch controller to use a synchronous demodulation channel that performs ADC stream data demodulation and integrates multiple demodulated data samples. In the synchronous demodulation channel, the ADC produces data twice per one excitation (TX) period. The output readings of the synchronous demodulation channel depend on a phase relationship between input current and a demodulation sequence and an input current amplitude. The output readings depend on the combination of the phase difference and input current amplitude. However, the synchronous demodulation channel does not have separated values of input signal amplitude and phase. The synchronous demodulation channel requires an integration window phase, $\Phi_{INT}$, tuning for each ISH tuning step. This makes the phase-mismatch calibration time (number of scans) unacceptably long, caused by the algorithm complexity with two nested tuning loops for ISH (external loop) and $\Phi_{INT}$ (internal loop). If $\Phi_{INT}$ doesn't match the phase of RX input current, the conversion result, $R_{SD}$, can potentially mask analog saturation in the ADC. That is, the produced ADC samples can be close to zero while internal ADC's analog integrators are saturated. This makes calibration less robust and may affect algorithm convergence. Also, since the synchronous demodulation channel uses the time interlaced each TX half-period charge accumulation and balancing stages, it is hard to know if the internal integration capacitor analog saturation happened or not. The incorrect output readings might be a result of analog saturation during the input charge integration stage.

Aspects of the present disclosure of embodiments overcome the deficiencies described above and others by providing phase information (and amplitude information) of a sense signal using at least four samples per one period of the sense signal and calibrating a phase mismatch based on the phase information. Aspects of the present disclosure can process the quadrature raw samples to estimate amplitude and phase information of the uncompensated capacitance, and a closed-loop calibration procedure can minimize the uncompensated capacitance. In at least one embodiment, the calibration procedures can use a capacitance sensing (CapSense) sigma-delta (CSD) sensing channel in connection with the quadrature demodulation. The quadrature demodulation channel can use a quarter period or shorter charge integrated time mode as compared to a standard mode with integration during a half-period for synchronous demodulation. Aspects of the present disclosure can use the phase and amplitude information for baseline tuning. The aspects of the present disclosure can be used for manufacturing calibration and run-time calibration (for temperature effect compensation) of a phase mismatch between the excitation and shield signals in an organic light-emitting diode (OLED) touch sensors, Touch and Display Integration (TDDI) touch sensors, and the like. Aspects of the present disclosure can use the proposed processing methods and sensing channels for other sensor types: impedance sensors, inductive, inductance sensors, inductive vibration sensors, such as illustrated and described below with respect to FIGS. 12A-17.

Aspects of the present disclosure can improve robustness and convergence of the phase-mismatch calibration method.

Unlike the synchronous demodulation channel, the quadrature modulation channel does not have an issue with possible channel saturation masked by data samples in a normal range. Aspects of the present disclosure can dramatically reduce calibration time to an acceptable duration for run-time operation, 5-6 times less than the synchronous demodulation channel as illustrated and described below with respect to FIGS. 6-7. Aspects of the present disclosure can significantly improve calibration accuracy, approximately 5 times better than the synchronous demodulation channel as illustrated and described below with respect to FIGS. 6-7.

FIG. 1 is a block diagram of a touch controller 100 with quadrature demodulation according to at least one embodiment. The touch controller 100 is coupled to a touch panel 102. The touch panel 102 can include one or more electrodes that form one or more touch sensors when coupled to the touch controller 100 (also referred to as "unit cells" or sensor cells). The touch controller 100 can measure a sensor capacitance, $C_S$, of each sensor of the touch panel 102. The touch controller 100 includes one or more receiver (RX) sensing channels 104 to measure the capacitance of the sensors of the touch panel 102. The touch controller 100 can include multiplexing circuitry 106 (e.g., TX/RX multiplexer) to couple one or more sensors to one or more RX sensing channels 104.

In at least one embodiment, the touch controller 100 uses shielded capacitive sensors. In this embodiment, the touch controller 100 includes a shield source 108 that generates a shield signal 101, $V_{SH}$. The shield source 108 can be programmable to adjust amplitude, phase, or both of the shield signal 101. The touch controller 100 can include a shield driver 110 to drive the touch panel 102 with the shield signal 101 via the multiplexing circuitry 106. The touch panel 102 can be a large capacitive load, and the shield driver 110 helps drive the shield signal 101 on a large capacitive load. The touch controller 100 includes an excitation source 112 that generates an excitation signal 103, $V_{EX}$. The excitation signal 103 can also be referred to as a transmit (TX) signal. The RX sensing channels 104 can use the excitation signal 103, $V_{EX}$, for measuring the capacitance, e.g. self-capacitance. The RX sensing channels 104 can receive a sense signal 105 from the touch panel. The RX sensing channels 104 can include an analog-to-digital converter (ADC) that generates at least four samples per one period of the excitation signal 103 (TX period). The RX sensing channels 104 can include other types of sensing channels, like CSD, standard ADC, Successive Approximation Register (SAR) ADC, or other types of charge-to-digital converters (CDCs). The touch controller 100 includes quadrature demodulation logic 114 that receives samples 107 from the RX sensing channels 104. The quadrature demodulation logic 114 processes the samples to obtain amplitude and phase information 109 (also referred to as quadrature-processed data). The touch controller 100 includes compensation logic 116 that receives the amplitude and phase information 109 from the quadrature demodulation logic 114. The compensation logic 116 can control the shield source 108 based on the amplitude and phase information 109. In one embodiment, the compensation logic 116 can send one or more control signals 111 to the shield source 108 to adjust the amplitude, the phase, or both, of the shield signal 101. The shield source 108 can be programmable and include independently adjustable output signal amplitude and phase of the shield signal 101. The compensation logic 116 can control the shield source 108 to generate the shield signal 101 with the same frequency and phase as the excitation signal 103. The compensation logic 116 provides synchronization between the shield source 108 and the excitation source 112 so that a phase difference between the two sources is kept constant for multiple scan cycles. In other embodiments, the excitation source 112 is programmable, and the excitation source 112 is compensated, instead of the shield source 108 or in addition to the shield source 108. In at least one embodiment, the compensation logic 116 comprises hardware, software, firmware, or any combination thereof. In at least one embodiment, the compensation logic 116 implements the compensation method or algorithm as executable code executed by a processing element of the touch controller 100. The compensation method can process the quadrature-processed data (e.g., residual channel readings) from the quadrature demodulation logic 114 and control the amplitude and phase of the shield source 108, the baseliner circuit 118, or both, using the quadrature-processed data. The compensation method can provide the operation synchronization between shield source 108 or baseline circuit 118, if present, and the excitation source 112 so that the phase difference between the sources is kept constant for multiple scan cycles. In another embodiment, both shield and excitation sources start from a same phase for the multiple scan cycles if there are no adjustments. This can be accomplished by having a common synchronization signal that initializes both sources to pre-programmed initial conditions. Thus, the same RX channel readings are obtained for the multiple scan cycles.

As described above, the quadrature demodulation logic 114 and the compensation logic 116 can be used to adjust the shield source 108 for shielded capacitive sensors. In other embodiments, the quadrature demodulation logic 114 and the compensation logic 116 can be used to adjust a baseliner circuit 118 in addition to the shield source 108. In some embodiments, the baseliner circuit 118 can be adjusted in systems where non-shielded capacitive sensors are being measured (i.e., in which the shield source 108 is not used). Additional details of the baseliner circuit 118 are described below with respect to FIGS. 9-10. In some cases, the baseliner circuit 118 is optional if the shield source 108 is used. In other cases, the baseliner circuit 118 is used in place of the shield source 108. In other cases, the baseliner circuit 118 is used in addition to the shield source 108. The baseliner circuit 118 can be used for ITO panel cost optimization reasons for the touch panels without a dedicated shield layer. In other embodiments, the shield source 108 and the excitation source 112 can be a common source, and any mismatch between the common source and the baseline circuit 118 can be compensated for by the compensation logic 116. In some cases, the RX sensing channels 104 need to tolerate higher amounts of uncompensated capacitance. In other embodiments, the capacitance compensation can be done by phase adjustment using the phase-shifting circuits (e.g., RC networks, tunable with the help of the programmable potentiometers), driven by the common signal source (i.e., no separate sources for the shield and excitation). In other embodiments, the quadrature demodulation logic 114 can implemented in Fast Fourier Transform (FFT) engine that computes a FFT of the samples 107 to determine the phase information for compensation. In other embodiments the quadrature demodulation logic 114 can be implemented using the Finite Impulse Response (FIR) filters. The compensation logic 116 can be implemented using the look-up-tables (LUT), linear/non-linear filters, direct search methods (like the fixed or variable step parameter sweep) or more advanced optimization techniques, depending on the application requirements.

In at least one embodiment, the quadrature demodulation logic 114 can use a quadrature demodulation sub-sample processing scheme instead of a synchronous demodulation scheme for the system calibration. The quadrature demodulation mode can reuse analog front-end (AFE) circuitry and can change digital logic (e.g., a channel engine) for the quadrature demodulation sub-sample processing scheme. The quadrature demodulation sub-sample processing scheme improves convergence, complexity, and accuracy of phase-mismatch calibration algorithm of the compensation logic 116. In at least one embodiment, the complexity or the number of scans (iterations) needed to optimize phase mismatch using the quadrature demodulation sub-sample processing scheme is about 5-6 times lower than a synchronous demodulation mode. The reason is that the synchronous demodulation requires an additional tuning of the integration window phase for each shield phase code step. The quadrature demodulation sub-sample processing scheme reduces calibration time, especially for phase mismatch compensation in run-time calibrations. The quadrature demodulation sub-sample processing scheme can improve the tuning accuracy by about 5 times higher than the synchronous demodulation mode for the same resolution grid of discrete parameters. In particular, the synchronous demodulation mode requires tuning of two discrete parameters: shield phase code and integration window phase code, whereas the quadrature demodulation sub-sample processing scheme can tune a shield phase code only. The quadrature demodulation sub-sample processing scheme returns phase information of the RX input current directly. This allows compensation logic 116 (e.g., firmware) to set a phase of compensation baseline waveform (e.g., pulse density modulator (PDM) bitstream) explicitly without any iteration calibration procedures. The quadrature demodulation sub-sample processing scheme helps detect and prevent analog saturation that can be potentially masked in the synchronous demodulation mode.

In at least one embodiment, the baseliner circuit 118 is programmable and includes independently adjustable output signal amplitude and phase of a baseline signal 115. The compensation logic 116 can send one or more control signals 113 to the baseline circuit 118 to adjust amplitude, phase, or both of the baseline signal 115. In some cases, the baseline signal 115 is removed from a sense signal 105 to measure changes relative to the baseline signal 115. The compensation logic 116 provides synchronization between the excitation source 112 and the baseliner circuit 118 so that a phase difference between the two sources is kept constant for multiple scan cycles. In other embodiments, the shield source 108, the excitation source 112, and the baseliner circuit 118 are programmable and adjusted in different combinations to compensate for amplitude or phase mismatches between the signals.

As described above, the touch controller 100 can be used with shielded or non-shielded capacitive sensors depending on the implementation. The capacitive sensors can be any type of sensors, such as on-stack, on-cell, in-cell, TDDI, OLED, or the like. The compensation logic 116 can be used for manufacturing and run-time calibration, such as for temperature effect compensation. The compensation logic 116 can be used to compensate for excitation and shield signal mismatch in various touch sensors, such as OLED and TDDI touch sensors. The compensation logic 116 can implement a calibration algorithm to compensate for any phase mismatch between the excitation signal 103 and the shield signal 101 or any phase mismatch between the excitation signal 103 and the baseline signal 115, as described herein.

In addition to the touch controller 100 being used with a touch panel 102, the touch controller 100 can be used in other applications, like inductive vibration sensors. The concept of the low-cost ADC (sigma-delta, CDC), baseliner, and compensation loop with the quadrature demodulation processing can be for capacitive touch applications and high-performance inductive vibration sensing applications as described herein. These embodiments provide lower overall solution cost by using sensor planar inductors on a printed circuit board (PCB), which operate at a higher frequency. These embodiments achieve sensor readings with high resolution because of the baseline removal and constant run-time tracking of the phase mismatch. The embodiments described herein can have high integration in which almost all sensor components, including an optional central processing unit (CPU) with on-chip memory can be implemented on a single die using a low-cost mixed-signal CMOS process. In other embodiments, the quadrature demodulation sub-sample processing scheme can be used in consumer applications, automotive applications, industrial human-machine interface (HMI) touch controllers, general-purpose sensor applications, inductive sensors, HMI controllers, OLED touch controllers, in-cell (TDDI) touch controllers, seat-occupancy detectors, proximity detectors, capacitive gesture recognition systems, capacitive position/angle sensors, liquid level capacitive sensors, AC bridge sensors, inductive vibration sensors, gas/air quality sensors, impedance meters, or the like.

Figure 2:
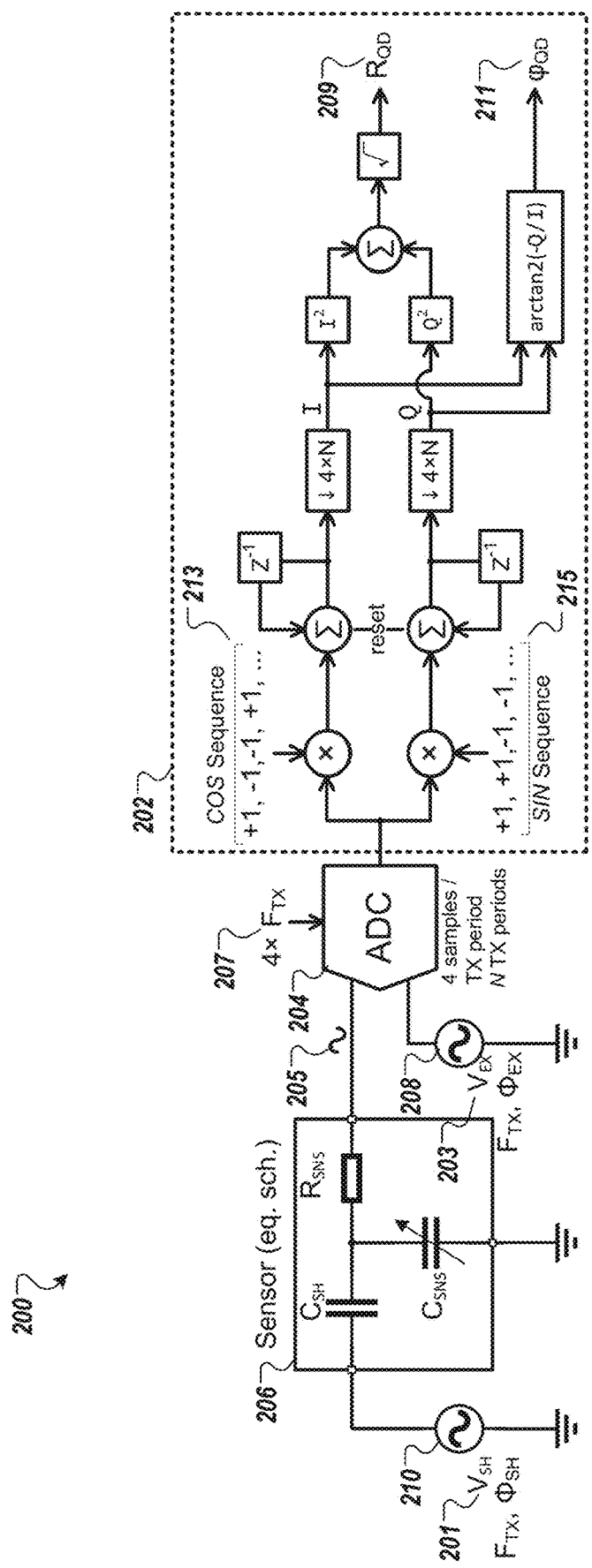
FIG. 2 is a schematic diagram of a receiver (RX) sensing channel with quadrature demodulation processing logic according to at least one embodiment.

FIG. 2 is a schematic diagram of an RX sensing channel 200 with quadrature demodulation processing logic 202 according to at least one embodiment. The RX sensing channel 200 uses a quadrature demodulation scheme for ADC sample processing with reduced charge integration time to reach a higher oversample ratio as part of a calibration method. The RX sensing channel 200 can be used with on-cell, on-stack, OLED, TDDI touch sensors, or the like.

In this embodiment, the RX sensing channel 200 includes an ADC 204 coupled to a sensor 206 and an excitation source 208. The ADC 204 can drive the sensor 206 in the self-capacitance sensing mode using the excitation source 208. ADC 204 senses the input current, and can be an integration type where its output readings are proportional to the input current integration for some period of time, e.g., quarter of TX frequency period. In some embodiments the ADC 204 has two internal analog integrators, which operate in the time-interlaced manner. In those embodiments, one integrator accumulates charge during some time interval and at same time charge from the second integrator is converted to the digital value, e.g., using the charge-to-time conversion principle. The integrators are swapped for the next conversion. Analog saturation happens if the peak voltage on the analog integrator exceeds some limit, resulting the incorrect data conversion. The sensor 206 is coupled to a shield source 210. During operation, the shield source 210 generates and applies a shield signal 201, $V_{SH}$, to the sensor 206. The shield signal 201 has a first frequency and a first phase. The excitation source 208 generates and applies an excitation signal 203, $V_{EX}$, to the ADC 204. The excitation signal 203 has a second frequency and a second phase. In at least one embodiment, the first frequency and the second frequency are the same ($F_{TX}$) and the first phase and the second phase are the same. However, there can be some phase mismatch between the first phase and the second phase, as described herein. The ADC 204 receives the excitation signal 203 and a sense signal 205 from the sensor 206. The ADC 204 samples the sense signal 205 and the excitation signal 203 with a clock signal 207 with an ADC sampling frequency that is four times the first frequency ($F_{TX}$) to generate four samples per each TX period for N number of TX periods, where N is a positive integer. In one embodiment, the input signal frequency and the ADC sampling frequency are derived from a same clock source. In at least one embodiment, the minimum oversampling ratio is 4 samples per TX period, as compared to two samples per period with synchronous demodulation schemes. The quadrature demodulation processing logic 202 processes the samples from the ADC 204. In the illustrated embodiment, the quadrature demodulation processing logic 202 includes two processing paths. In a first path, a cosine sequence 213 is applied to the samples, the samples are accumulated, and the accumulation is down-sampled (4×N) to obtain in-phase samples (I samples). In a second path, a sine sequence 215 is applied to the samples, the samples are accumulated, and the accumulation is down-sampled (4×N) to obtain quadrature samples (Q samples). To determine an amplitude 209, $R_{QD}$, of the sense signal 205, the quadrature demodulation processing logic 202 squares the I samples, squares the Q samples, adds their results as a sum and takes the square root of the sum. To determine a phase 211, $\varphi_{QD}$, of the sense signal 205, the quadrature demodulation processing logic 202 computes the arctangent of the Q and I samples ratio (e.g., arctan 2(−Q/I)). The signs of the individual components Q and I can be analyzed additionally to enable phase calculation in the range of $-\pi \ldots \pi$, as arctan 2 function is periodic with a period $\pi$. For non-zero input current with arbitrary phase, the samples captured in quadrature demodulation mode are also non-zero, which is not true for synchronous demodulation mode.

Using a sinusoidal input signal in the quadrature demodulation mode, the voltage on an ADC integrator taken at an arbitrary time does not exceed maximum and minimum values of the captured voltage samples (S0 . . . S3). In contrast, in the synchronous demodulation mode, the channel can produce a zero sample without a sign of saturation even though the internal ADC integrator can be saturated. The RX sensing channel 200 in the quadrature demodulation mode returns the amplitude 209 and the phase 211 of the input signal. Thus, the phase 211 for compensation can be defined accurately without calibration steps. The phase for the compensation can be represented by a PDM bitstream, as described herein. The phase 211 can be used to adjust the excitation signal 208. In other embodiments, the phase 211 can be used to tune a baseliner circuit. In other embodiments, the compensation can use both the amplitude and the phase information that is available from the quadrature demodulation processing logic 202.

Figure 3:
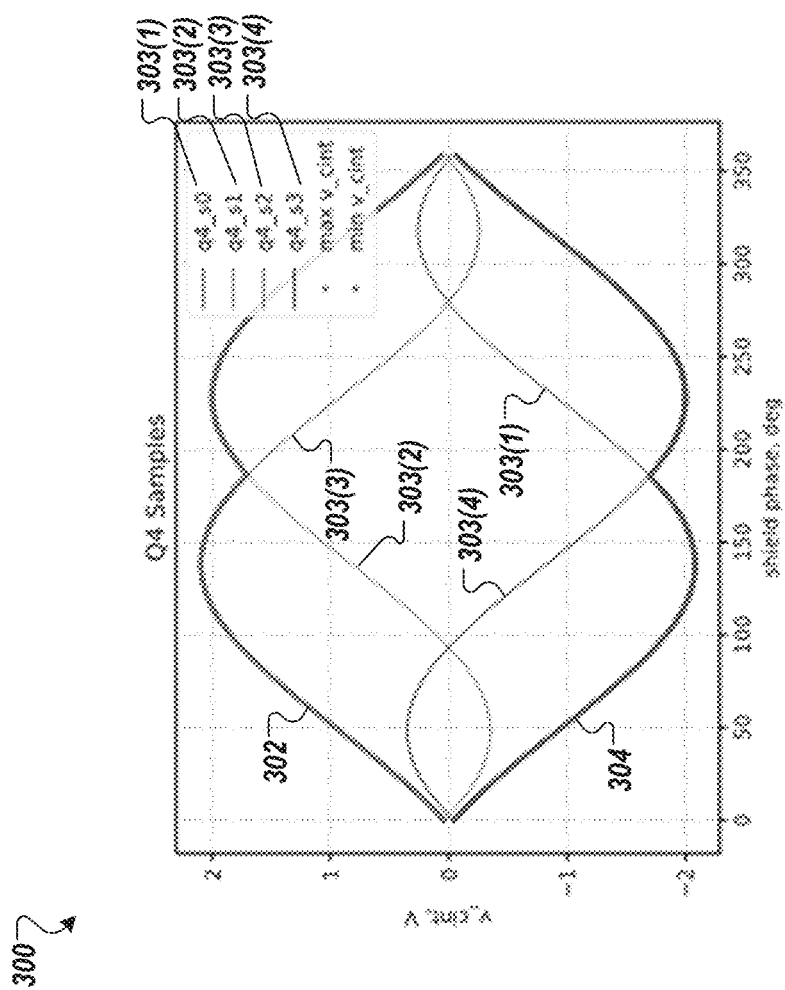
FIG. 3 is a waveform diagram of quadrature samples and maximum and minimum voltages on an integrator as a function of shield signal phase according to at least one embodiment.
Figure 4A:
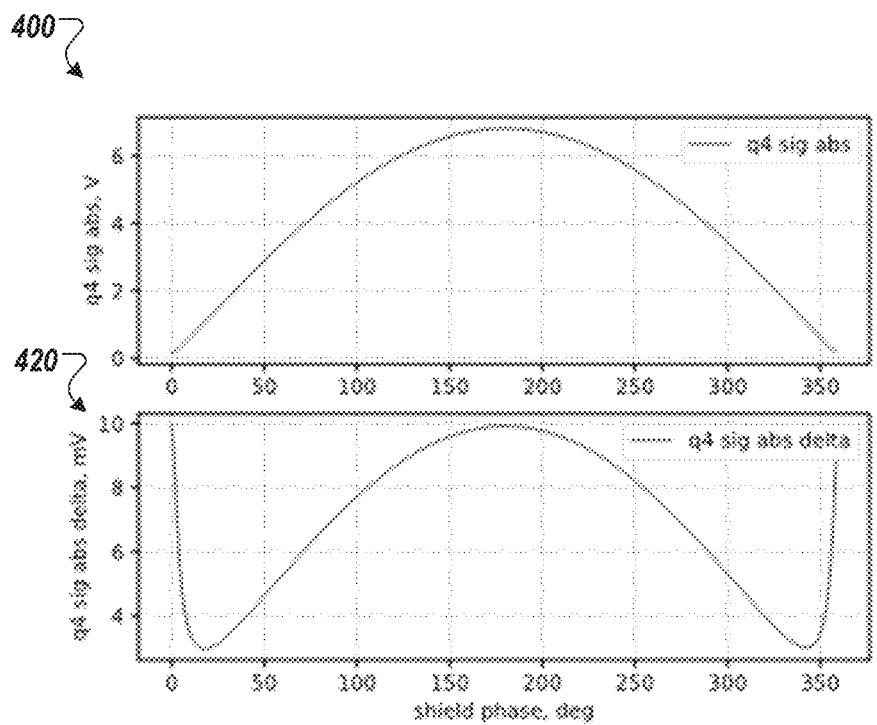
FIG. 4A are waveform diagrams of a quadrature amplitude and an amplitude touch delta response as a function of shield signal phase according to at least one embodiment.
Figure 4B:
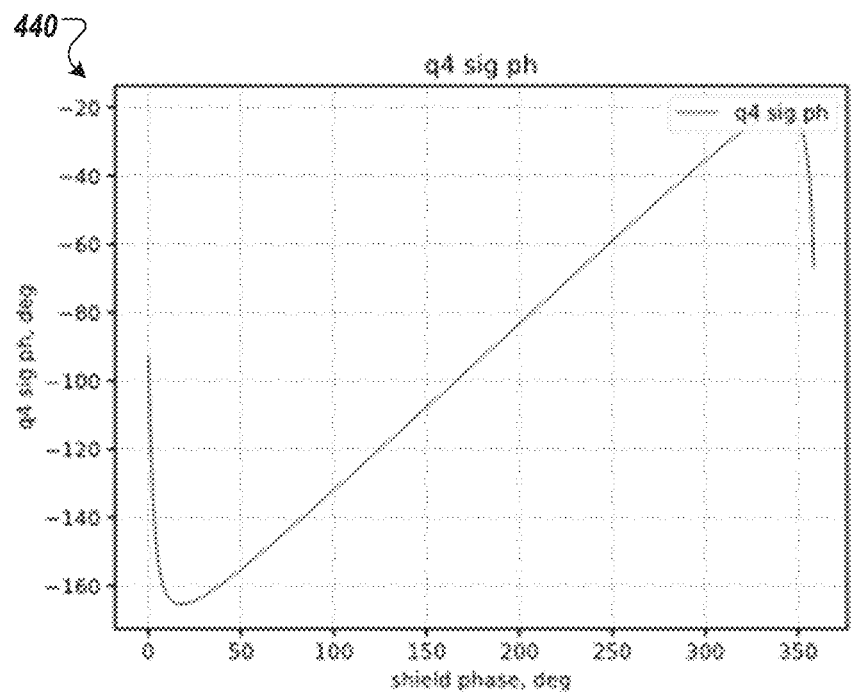
FIG. 4B is a waveform diagram of a quadrature phase as a function of a shield signal phase according to at least one embodiment.

FIGS. 3-4B demonstrate RX channel operation properties in a quadrature modulation mode in an in-cell panel for a shield signal phase sweep in a range of [0; 2π], and the excitation phase remains constant at 0°.

FIG. 3 is a waveform diagram 300 of quadrature samples and maximum and minimum voltages on an integrator as a function of shield signal phase according to at least one embodiment. The waveform diagram 300 shows a maximum voltage 302 (max v_cint) and a minimum voltage 304 (min v_cint) of an input signal. The input signal is a sinusoidal signal. The waveform diagram 300 also shows the four samples 303, including s0 303(1), s1 303(2), s2 303(3), and s3 303(4), taken over the shield signal phase sweep. As illustrated in FIG. 3, the four samples at any point in the sweep do not exceed the maximum voltage 302 and minimum voltage 304 on the integrator. That is, the integrator does not saturate if the quadrature samples remain within the specified maximum and minimum voltages.

FIG. 4A are waveform diagrams of a quadrature amplitude 400 $R_{QD}$ and an amplitude touch delta response 420 $\Delta R_{QD}$, as a function of shield signal phase according to at least one embodiment. As illustrated in FIG. 4A, the quadrature amplitude 400 $R_{QD}$ reaches a minimum for zero phase mismatch between excitation and shield signal. Zero phase mismatch also corresponds to the maximum quadrature amplitude touch delta 420 $\Delta R_{QD}$.

FIG. 4B is a waveform diagram 440 of a quadrature phase as a function of a shield signal phase according to at least one embodiment. FIG. 4B shows how the quadrature phase changes versus the shield signal phase. For zero phase mismatch, the quadrature phase approaches 90°.

As such, the quadrature amplitude value can be used as a metric for the excitation-shield phase-mismatch calibration algorithm. A minimum value of quadrature amplitude corresponds to the best phase match and optimal operation point. For quadrature demodulation mode, the compensation of initial phase mismatch can be implemented as tuning of the shield signal phase code (value) based on the quadrature amplitude value ($R_{QD}$) returned by the RX sensing channel. In at least one embodiment, the compensation algorithm adjusts a phase code until a minimum amplitude value is reached.

As described above, a compensation algorithm has to tune two parameters for synchronous demodulation mode: shield phase code and integration window phase code. The tuning procedure looks as two nested loops. The external loop adjusts the shield phase code to obtain minimum accumulated samples value ($R_{SD}$); the internal loop adjusts integration window phase code to obtain maximum accumulated samples value ($R_{SD}$) for the given shield phase code. In other words, for each shield phase code step, the integration window code must be best tuned. The optimization procedure can be implemented as a simple per-element search in both cases (shield phase and integrator window phase). The compensation algorithm starts from the initial code and steps to the adjacent code to determine code change direction. Once the direction is optimized, the algorithm changes a code incrementally until an extremum is reached. However, as described below with respect to FIG. 5, in the quadrature modulation mode, the compensation algorithm has to tune one parameter, the shield phase code. That is, the RX sensing channel using quadrature demodulation mode requires a single scan after each shield phase code adjustment, whereas the synchronous modulation mode requires a series of scans to optimize an integration window phase for each shield phase code adjustment for maximum channel response.

Figure 5:
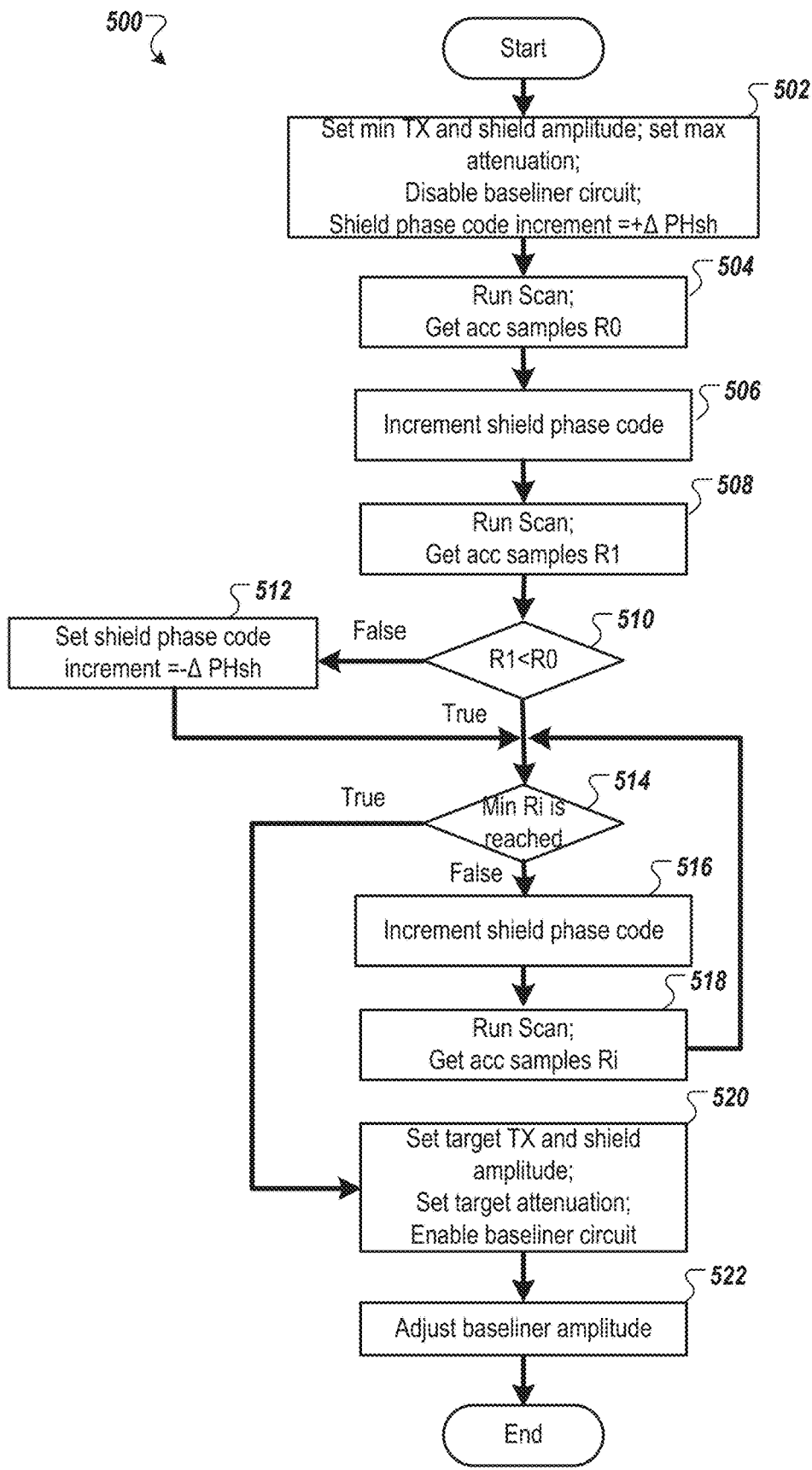
FIG. 5 is a flow diagram of a mismatch calibration method for excitation and shield signals according to at least one embodiment.

FIG. 5 is a flow diagram of a mismatch calibration method 500 for excitation and shield signals according to at least one embodiment. In some embodiments, processing logic may perform the method 500. The processing logic may include hardware, software, or any combination thereof. In one embodiment, compensation logic 116 of FIG. 1 performs the method 500. In another embodiment, the touch controller 100 of FIG. 1 performs the method 500. Alternatively, other components may be used to perform some or all of the operations of method 500.

Referring to FIG. 5, the processing logic begins the method 500 by setting a minimum excitation (TX) and shield amplitude and setting a shield phase code increment equal to a positive value, $+\Delta PHsh$ (block 502). The processing logic can also set a maximum attenuation and disable a baseliner circuit. The processing logic runs a scan to obtain accumulation samples R0 (block 504). The processing logic increments the shield phase code (block 506) and runs another scan to obtain accumulation samples R1 (block 508). The processing logic determines whether R1 is less than R0 (block 510). If false, the processing logic sets the shield phase code increment to a negative value, $-\Delta PHsh$ (block 512). The processing logic determines whether the minimum sample, Ri, is reached (block 514). If false, the processing logic increments the shield phase code using the shield phase code increment (block 516) and runs the next scan to obtain the next accumulation samples, Ri (block 518). The processing logic returns to block 514 to determine if the minimum Ri is reached. The processing logic continues in the loop until the minimum Ri is reached at block 514. When the minimum Ri is reached at block 514, the processing logic sets a target amplitude for the TX and shield signals (block 520). The processing logic can also set the target attenuation and enable the baseliner circuit at block 520. The processing logic can set the baseliner amplitude (block 522) and the method 500 ends. It should be noted that both excitation and shield sources use common synchronization logic to start operating synchronously during the multiple conversion cycles.

It should be noted that, in the synchronization demodulation mode, multiple scans would have to be run at blocks 504, 508 and 518 to maximize accumulation samples R0, R1 and Ri correspondingly by changing the integration window phase. In short, another nested loop would be needed to optimize the integration window phase. The difference in complexity and accuracy of the calibration algorithms are illustrated and described below with respect to FIGS. 6-7.

Figure 6:
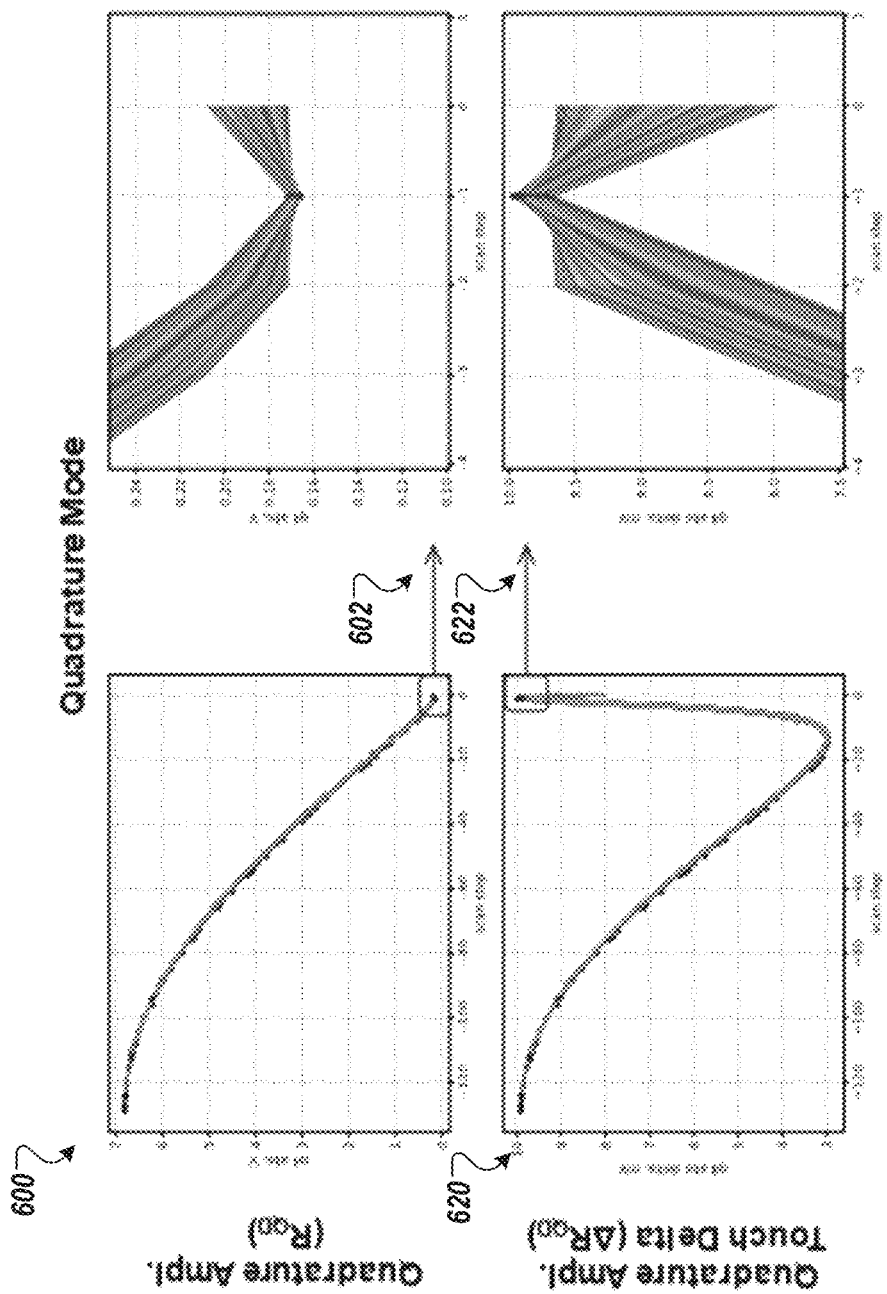
FIG. 6 are waveform diagrams of the phase-mismatch calibration assessment in a quadrature demodulation mode according to at least one embodiment.

FIG. 6 are waveform diagrams 600, 620 of the phase-mismatch calibration assessment in a quadrature demodulation mode according to at least one embodiment. The waveform diagram 600 shows the quadrature amplitude $R_{QD}$, as a function of the scan step, and the waveform diagram 620 shows the amplitude touch delta response $\Delta R_{QD}$, as a function of the scan step. For initial random phase mismatch, a compensation algorithm minimizes this mismatch by analyzing captured samples and adjusting the shield phase over a grid of discrete values. The calibration algorithm can be called multiple times, and each time initial conditions are randomized. In these examples, initial phase mismatch and initial shield phase code for quadrature demodulation mode are randomized. An expanded view 602 shows a convergence of the quadrature amplitude $R_{QD}$ and an expanded view 622 shows a convergence of the amplitude touch delta response $\Delta R_{QD}$.

Figure 7:
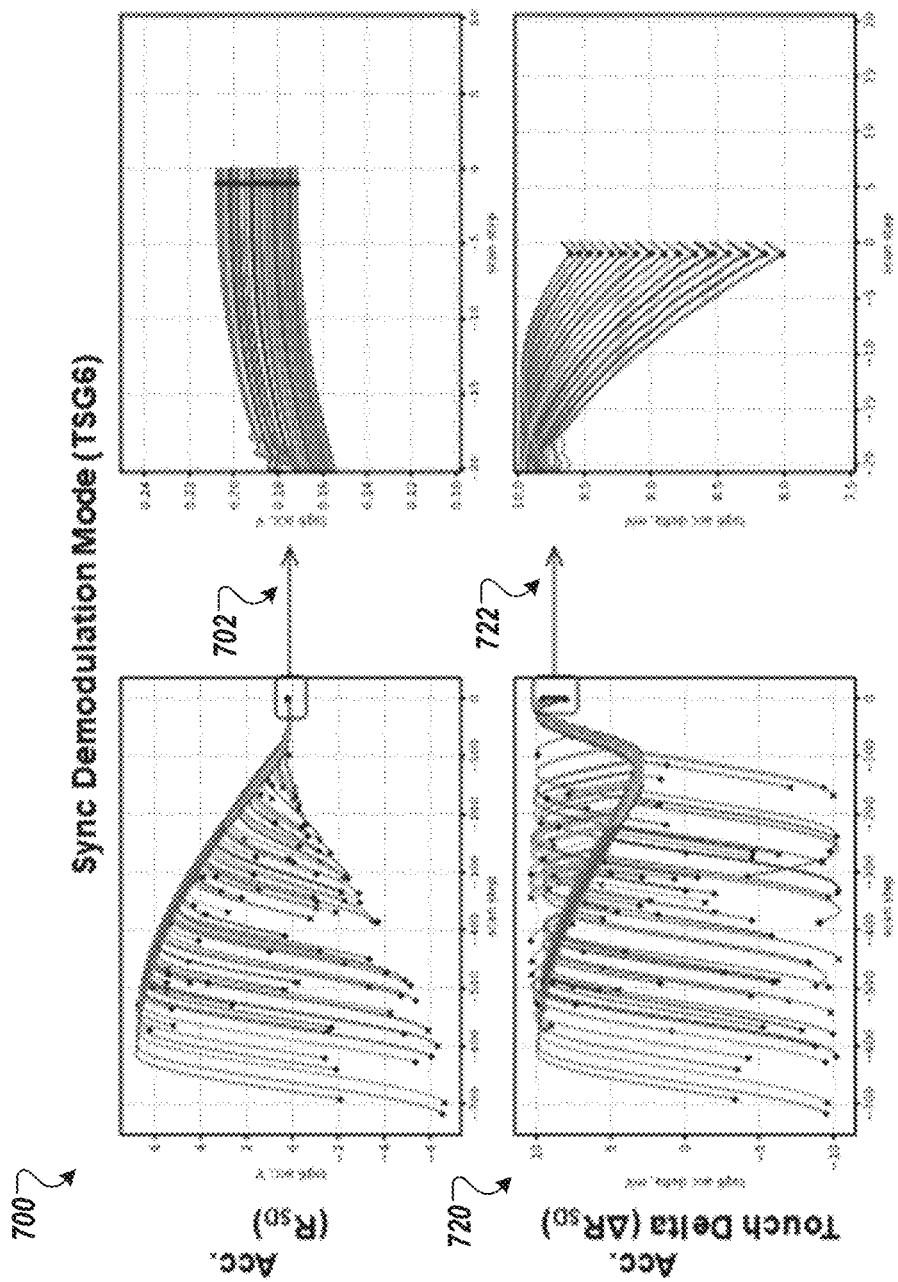
FIG. 7 are waveform diagrams of the phase-mismatch calibration assessment in a synchronous demodulation mode according to at least one embodiment.

FIG. 7 are waveform diagrams 700, 720 of the phase-mismatch calibration assessment in a synchronous demodulation mode according to at least one embodiment. The waveform diagram 700 shows the accumulated value $R_{SD}$ as a function of the scan step, and the waveform diagram 720 shows the touch delta response $\Delta R_{SD}$, as a function of the scan step. For initial random phase mismatch, a compensation algorithm minimizes this mismatch by analyzing captured samples and adjusting the shield phase over a grid of discrete values. The calibration algorithm can be called multiple times, and each time initial conditions are randomized. In these examples, initial phase mismatch, initial shield phase, and initial integration window phase code for synchronous demodulation mode are randomized. An expanded view 702 shows a convergence of the accumulated values $R_{SD}$, and an expanded view 722 shows a convergence of the touch delta response $\Delta R_{SD}$.

As illustrated in FIGS. 6-7, the accumulated value $R_{SD}$ and the touch delta response $\Delta R_{SD}$ do not converge as quickly or as accurately as the quadrature amplitude $R_{QD}$ and the amplitude touch delta response $\Delta R_{QD}$. In these examples, the accumulated samples are depicted in figures and show channel metrics from which the calibration procedure started towards the left and where the calibration procedure ended toward the right. The average number of scans needed to optimize phase mismatch for quadrature demodulation mode is about 5-6 times lower than for synchronous demodulation mode. For quadrature demodulation mode, tuning accuracy is about 5 times higher than for synchronous demodulation mode for the same resolution grid of discrete parameters.

The compensation method can be used for manufacturing calibration and run-time calibration of excitation and shield signal phase mismatch in various types of sensors. The phase-mismatch calibration method can improve robustness and convergence. As described herein, the quadrature demodulation channel does not mask channel analog saturation, unlike the synchronous demodulation channel. The phase-mismatch calibration method can reduce calibration time to an acceptable duration for run-time calibration, e.g., 5-6 times reduction as compared to the synchronous demodulation as illustrated in FIGS. 6-7. The phase-mismatch calibration method can improve calibration accuracy, e.g., about 5 times as compared to the synchronous demodulation as illustrated in FIGS. 6-7.

As described above, the quadrature demodulation processing can be used with shielded capacitive sensors where the uncompensated capacitance is minimized by adjusting the shield source amplitude and phase. In other embodiments, the quadrature demodulation processing can be used to adjust the baseliner circuit, instead of the shield source for unshielded sensor applications. Other types of ADCs can be used in other embodiments, such as a sigma-delta modulator (CSD channel), as illustrated in FIG. 8.

Figure 8:
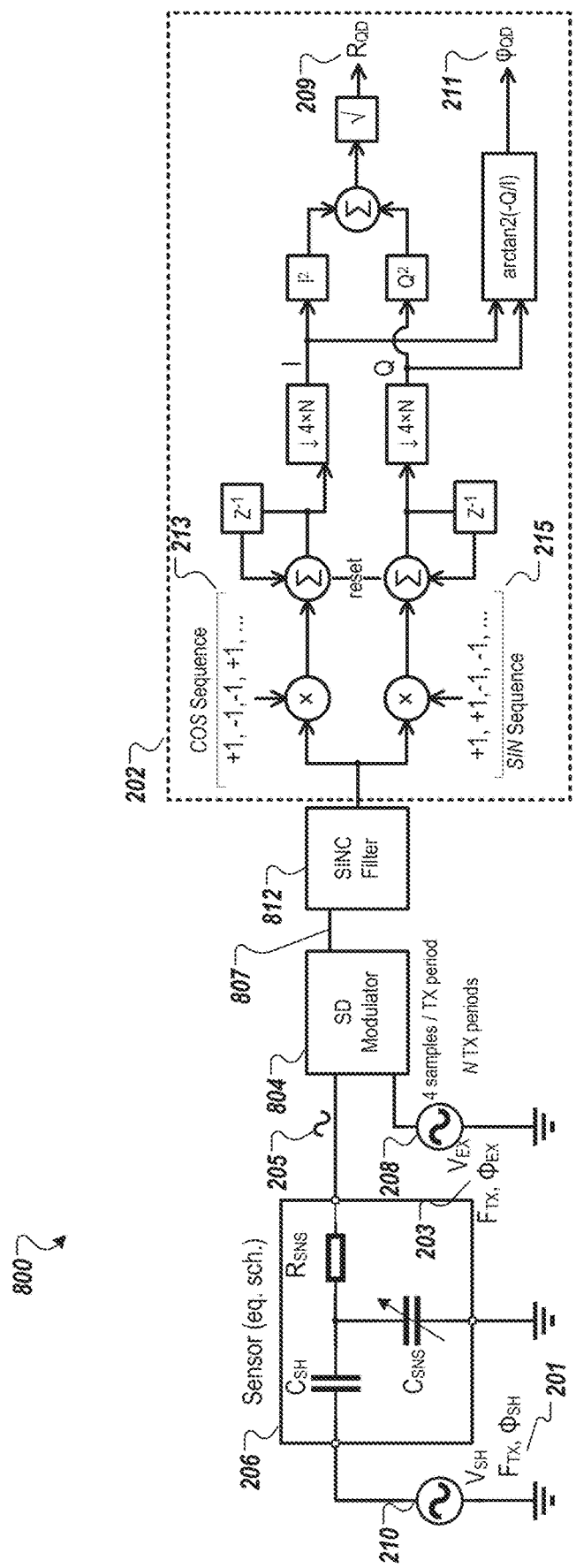
FIG. 8 is a schematic diagram of a RX sensing channel with a sigma-delta modulator according to at least one embodiment.

FIG. 8 is a schematic diagram of an RX sensing channel 800 with a sigma-delta modulator 804 according to at least one embodiment. The RX sensing channel 800 is similar to RX sensing channel 200 as noted by similar reference numbers, except the RX sensing channel 800 includes the sigma-delta modulator 804 and a sinc filter 812, instead of ADC 204. The sigma-delta modulator 804 is coupled to the sensor 206 and the excitation source 208. The sensor 206 is coupled to the shield source 210. During operation, the shield source 210 generates and applies the shield signal 201, $V_{SH}$, to the sensor 206. The shield signal 201 has a first frequency and a first phase. The excitation source 208 generates and applies the excitation signal 203, $V_{EX}$, to the sigma-delta modulator 804. The excitation signal 203 has a second frequency and a second phase. In at least one embodiment, the first and second frequencies are the same ($F_{TX}$) and the first and second phases are the same. However, there can be some phase mismatch between the first and second phases, as described herein. The sigma-delta modulator 804 receives the excitation signal 203 and the sense signal 205 from the sensor 206. The sigma-delta modulator 804 samples the sense signal 205 and the excitation signal 203 and SINC filter 812 processes the modulator bitstream and generates at least four samples per TX period for N number of TX periods, where N is a positive integer. The samples can be an output bitstream 807. The sinc filter 812 filters the output bitstream 807 and provides the filtered samples to the quadrature demodulation processing logic 202. The quadrature demodulation processing logic 202 processes the samples from the sigma-delta modulator 804. As described above, the quadrature demodulation processing logic 202 includes two processing paths. In the first path, a cosine sequence 213 is applied to the samples, the samples are accumulated, and the accumulation is down-sampled (4×N) to obtain I samples. In a second path, the sine sequence 215 is applied to the samples, the samples are accumulated, and the accumulation is down-sampled (4×N) to obtain Q samples. To determine the amplitude 209, $R_{QD}$, of the sense signal 205, the quadrature demodulation processing logic 202 squares the I samples, squares the Q samples, adds their results as a sum, and takes the square root of the sum. To determine the phase 211, $\varphi_{QD}$, of the sense signal 205, the quadrature demodulation processing logic 202 computes the arctangent of the Q and I samples ratio (e.g., arctan 2(−Q/I)). The RX sensing channel 800 in the quadrature modulation mode returns the amplitude 209 and the phase 211 of the input signal. Thus, the phase 211 for compensation can be defined accurately without calibration steps. The phase for the compensation can be represented by a PDM bitstream, as described herein. The phase 211 can be used to adjust the excitation signal 208. In other embodiments, the phase 211 can be used to tune a baseliner circuit. In other embodiments, the compensation can use both the amplitude and the phase information that is available from the quadrature demodulation processing logic 202.

It should be noted that some commercial applications use a shield ITO layer that adds additional cost and can degrade optical performance due to less transparency and possible internal reflections. In these embodiments, instead of using the shield layer, the excessive sensor capacitance can be compensated for by a baseliner circuit, installed at the front of the RX sensing channel. The baseliner circuit can inject a compensation current in the opposite direction to a sensor current. In this embodiment, the compensation current should have the same amplitude as the sensor current. The phase of the compensation current is 180° degrees shifted to form the opposite direction current. Therefore, to address the problem of the baseliner tuning, the quadrature demodulation processing logic 202 can determine the amplitude and phase for compensation of the baseliner circuit in a similar way as the shield source described above as illustrated in FIG. 9.

Figure 9:
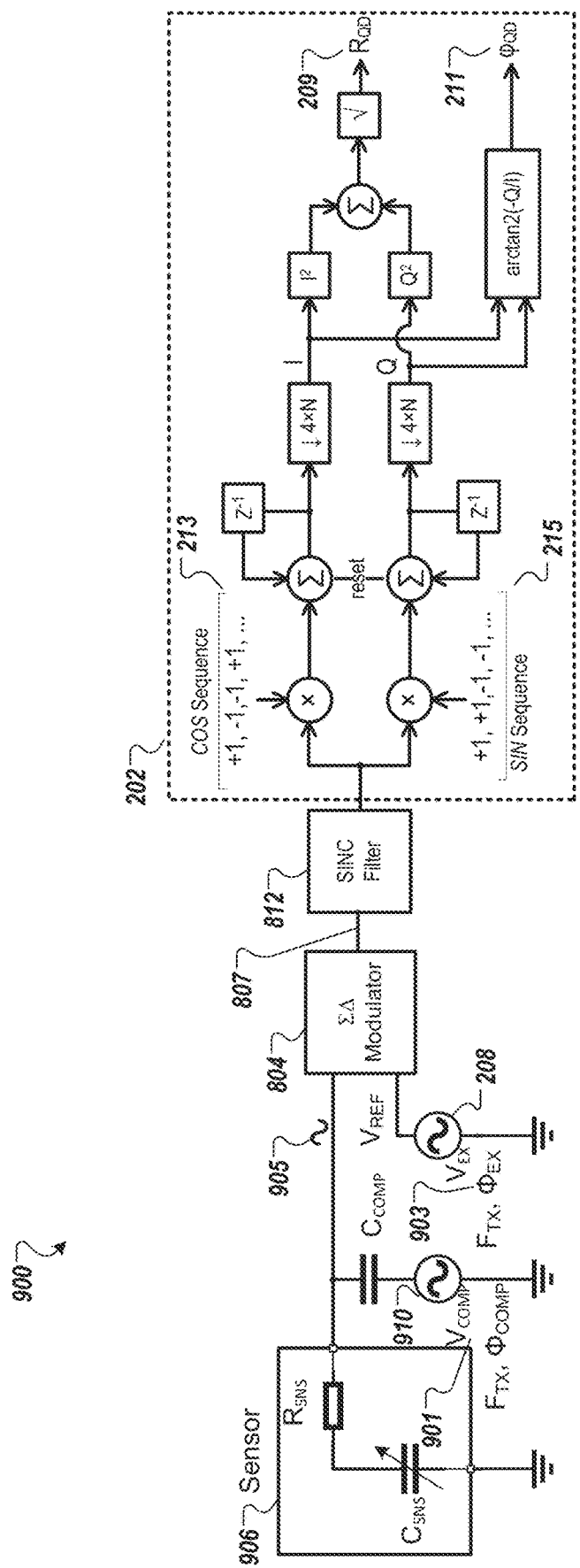
FIG. 9 is a schematic diagram of a RX sensing channel with a programmable compensation source for baseline compensation according to at least one embodiment.

FIG. 9 is a schematic diagram of an RX sensing channel 900 with a programmable compensation source 910 for baseline compensation according to at least one embodiment. The RX sensing channel 900 is similar to the RX sensing channel 800 as noted by similar reference numbers, except the RX sensing channel 900 includes the programmable compensation source 910 that operates as a baseliner circuit. The sensor 906 is coupled to the sigma-delta modulator 804. The sensor 906 is not driven by a shield signal as described above with respect to FIG. 8. Rather, the programmable compensation source 910 applies a compensation signal 901 to a sense signal 905 before the RX sensing channel 900. The sigma-delta modulator 804 is coupled to the sensor 906 and the excitation source 208. As described above, the compensation current 901 should have the same amplitude as the sense signal 905 (input current). The phase of the compensation current 901 is 180° degrees shifted to form the opposite direction current. The compensation signal 901 can be adjusted based on the amplitude 209 and phase 211 determined by the quadrature demodulation processing logic 202. In this embodiment, the compensation source 910 provides the sample frequency signal, $F_{TX}$, as the sense current and compensation source amplitude, $V_{COMP}$, and phase, $\Phi_{COMP}$, is adjusted by the compensation algorithm.

Figure 10:
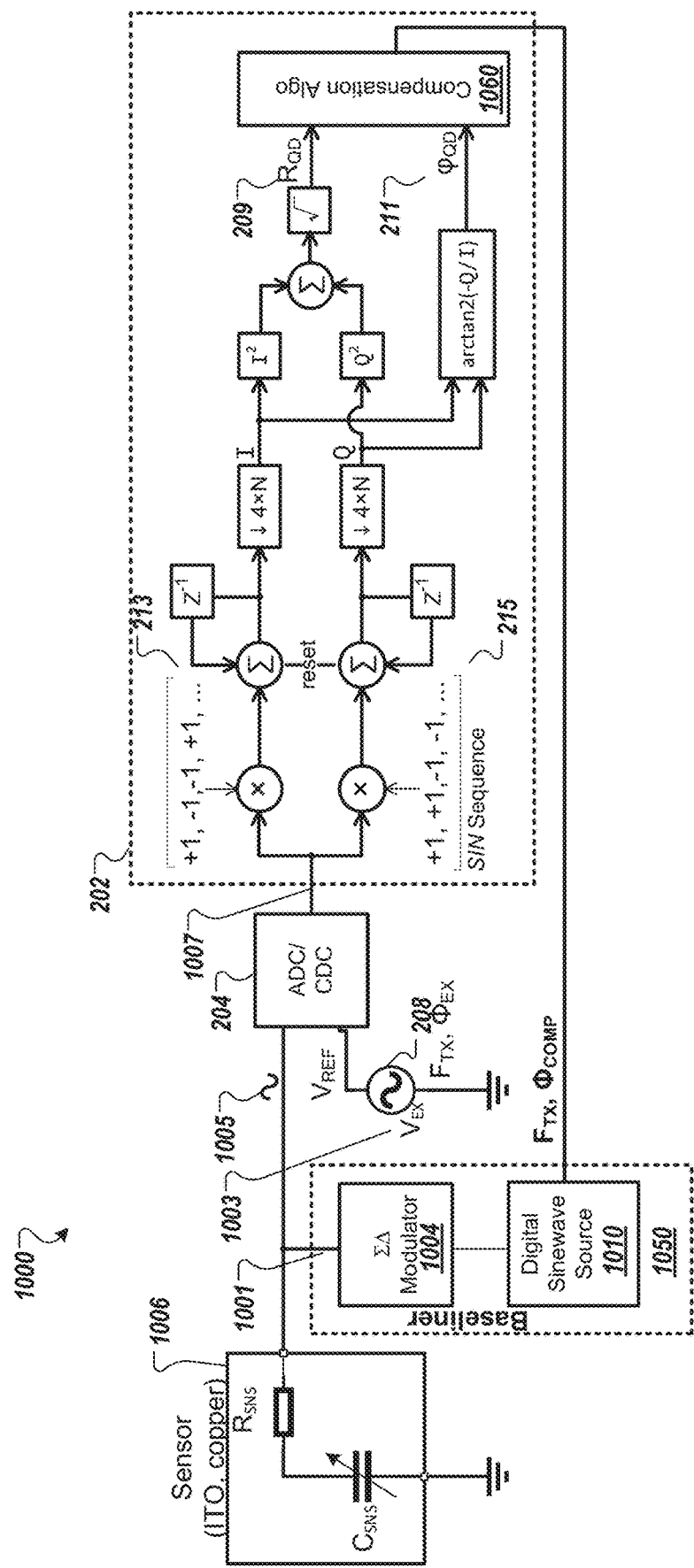
FIG. 10 is a schematic diagram of a RX sensing channel with a sigma-delta modulator for baseline compensation according to at least one embodiment.

In at least one embodiment, the baseliner compensation source can be built using a sigma-delta modulator, driven by a digital sinewave source, such as illustrated in FIG. 10.

FIG. 10 is a schematic diagram of an RX sensing channel 1000 with a sigma-delta modulator for baseline compensation according to at least one embodiment. The RX sensing channel 1000 is similar to the RX sensing channel 200 as noted by similar reference numbers, except the RX sensing channel 1000 includes a baseliner circuit 1050. The baseliner circuit 1050 includes a baseliner's sigma-delta modulator 1004 and a digital sinewave source 1010. The baseliner circuit 1050 is controllable by a compensation algorithm 1060, as described herein. The RX sensing channel 1000 includes the ADC 204 (or CDC as described herein) coupled to a sensor 1006 and the excitation source 208. The baseliner circuit 1050 is also coupled to the sensor 1006. During operation, the baseliner circuit 1050 generates and applies a compensation signal 1001 to a sense signal 1005. The excitation source 208 generates and applies an excitation signal 203, $V_{EX}$, to the ADC 204. The ADC 204 receives the excitation signal 1003 and the sense signal 1005 from the sensor 1006. The ADC 204 samples the sense signal 1005 and generates four samples per each TX period for N number of TX periods, where N is a positive integer. The quadrature demodulation processing logic 202 processes the samples from the ADC 204 to determine the amplitude 209 and the phase 211. The compensation algorithm 1060 uses the amplitude 209 and the phase 211 to adjust the digital sinewave source 1010 of the baseliner circuit 1050.

In at least one embodiment, the baseliner circuit 1050 is a cost-effective option for building the compensation circuit in a touch controller chip. During operation, the sigma-delta modulator 1004 converts the digital sinewave source output to the modulated at a TX frequency variable density bitstream output. An example of the variable density modulated bitstream is illustrated in FIG. 11.

Figure 11:
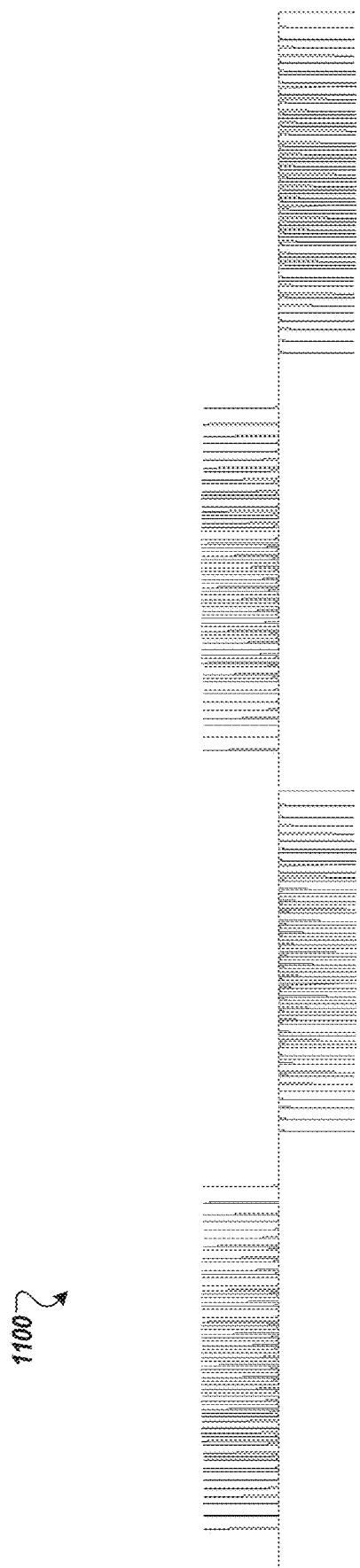
FIG. 11 is a waveform diagram of a variable density modulated bitstream at an output of a sigma-delta modulator according to at least one embodiment.

FIG. 11 is a waveform diagram of a variable density modulated bitstream 1100 at an output of a sigma-delta modulator according to at least one embodiment. As described herein, using an integration-type sensing channel, the pulsed compensation currents can be handled without any issue.

As described herein, the quadrature demodulation and compensation schemes described herein can be used in numerous alternative use cases, such as other sensor types as described below with respect to FIGS. 12A-17. For some examples, the quadrature demodulation and compensation schemes described herein can be used in AC bridge sensors, inductive displacement sensors (e.g., in white goods) or industrial applications, gas/air quality sensors, impedance meters, or the like. In these applications, a small variation of informative parameter changes needs to be detected at the presence of a large non-informative baseliner component. These applications can use sinusoidal excitation waveforms. It should be noted that vibration inductance sensors are important in some applications, especially automotive and industrial applications. The inductive vibration sensors can be used for such applications as they tolerate very aggressive environments and work in an extensive range of temperatures. Examples of vibration sensors include a vibrating pipe flow rate sensor using Coriolis force, as illustrated in FIG. 12A, a flexing tube liquid level sensor, as illustrated in FIG. 12B, a torsion rod liquid density sensor, as illustrated in FIG. 13A, or a longitudinally resonating plate for viscosity measurement, as illustrated in FIG. 13B.

Figure 12A:
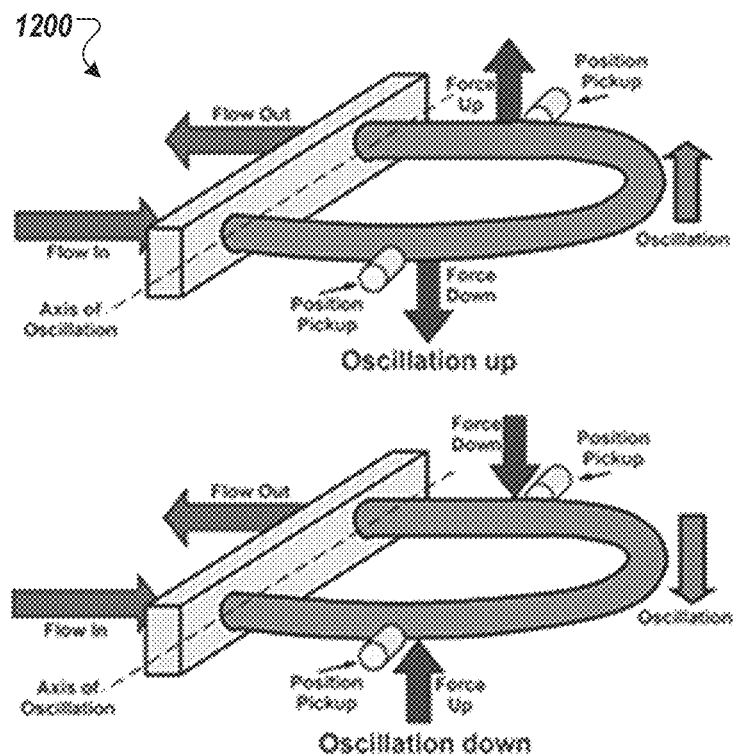
FIG. 12A illustrates a vibrating pipe flow rate sensor using Coriolis Force for measuring vibrating pipe flow rate according to at least one embodiment.

FIG. 12A illustrates a vibrating pipe flow rate sensor 1200 using Coriolis Force for measuring vibrating pipe flow rate according to at least one embodiment.

Figure 12B:
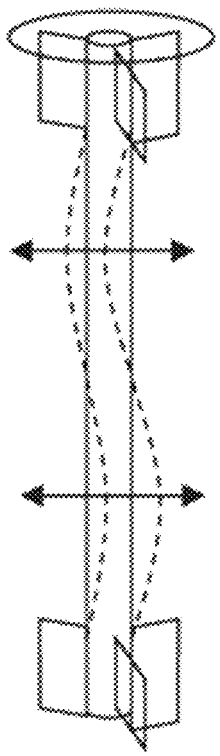
FIG. 12B illustrates a flexing tube liquid level sensor for measuring liquid level according to at least one embodiment.

FIG. 12B illustrates a flexing tube liquid level 1250 sensor for measuring liquid level according to at least one embodiment. The flexing tube liquid level 1250 can be used for detergent, washer fluid, or diesel exhaust fluid.

Figure 13A:
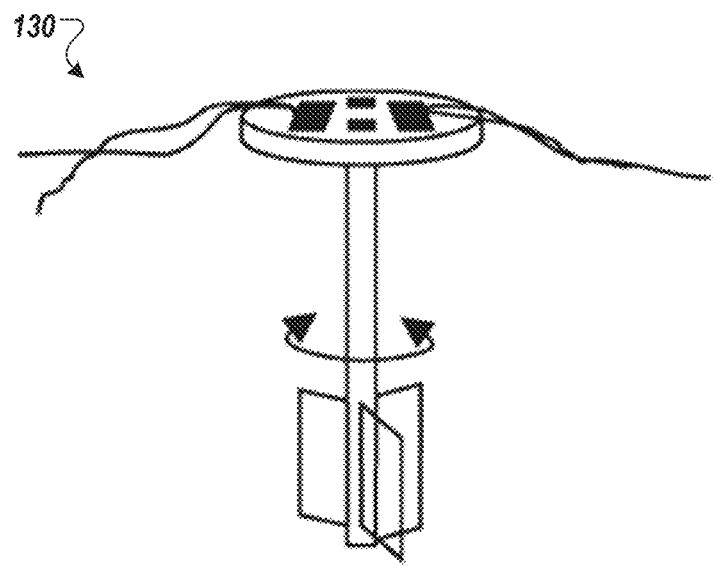
FIG. 13A illustrates torsion rod liquid density sensor for measuring liquid density according to at least one embodiment.
Figure 13B:
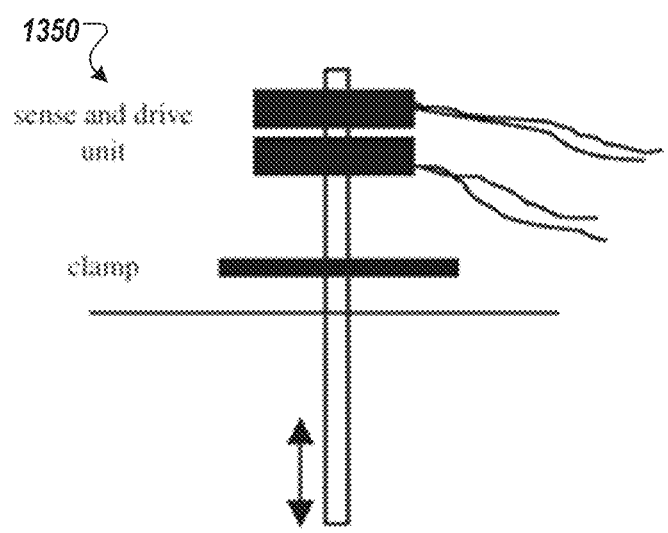
FIG. 13B illustrates a longitudinally resonating plate for measuring viscosity according to at least one embodiment.

FIG. 13A illustrates a torsion rod liquid density sensor 1300 for measuring liquid density according to at least one embodiment. The torsion rod liquid density sensor 1300 can be used for Lead Acid Battery electrolytes.

FIG. 13B illustrates a longitudinally resonating plate 1350 for measuring viscosity according to at least one embodiment. The longitudinally resonating plate 1350 can be used to check oil quality.

In general, for the sensors above, a small variation of the amplitude and phase needs to be detected to measure the physical object's properties change (e.g., liquid viscosity). The property changes can be detected using an inductive sensor as described above in connection with the quadrature demodulation and compensation scheme. Additional details of the inductive sensor are described below with respect to FIGS. 14-17. It should be noted that in some embodiments, an external mechanical transducer can be used to oscillate the sensor. The mechanical systems can oscillate in the frequency range of 100 Hz to 10 kHz or even higher. In other embodiments, the sensors may oscillate on their own. In order to detect the small variation of the vibrating object's amplitude and phase (e.g., 1-5% of the base level), small and compact planar inductors (1 uH-10 uH) that operate at the high frequency (e.g., 1-10 MHz) can be used. A measurement circuit can provide readings at a sample rate several times higher than the vibrating frequency (e.g., 50 kHz). As described herein, a compensation loop with quadrature demodulation can detect the small variations of the input parameter, such as illustrated in FIG. 14.

Figure 14:
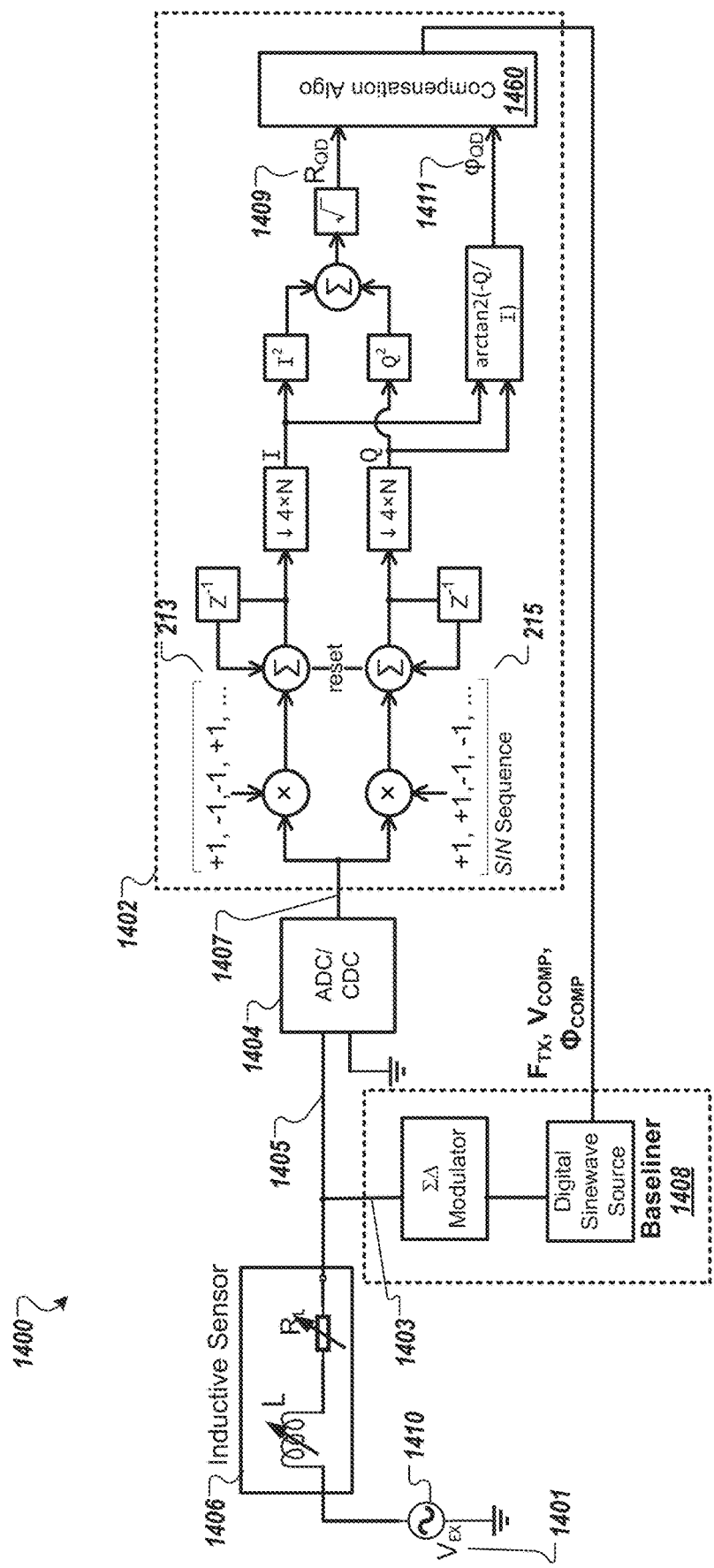
FIG. 14 is a schematic diagram of a RX sensing channel for an inductive vibration sensor according to at least one embodiment.

FIG. 14 is a schematic diagram of an RX sensing channel 1400 for an inductive vibration sensor according to at least one embodiment. The inductive vibration sensor is represented as an inductive sensor 1406 coupled to an ADC 1404 (or CDC as described herein). An excitation source 1410 generates an excitation signal 1401 and applies the excitation signal 1401 to the inductive sensor 1406. A baseliner circuit 1408 generates a compensation signal 1403 that is applied to a sense signal 1405 from the inductive sensor 1406.

In this embodiment, the RX sensing channel 1400 includes an ADC 1404 coupled to an inductive sensor 1406. The ADC 204 samples the sense signal 1405 and generates four samples per each TX period for N number of TX periods, where N is a positive integer. The quadrature demodulation processing logic 1402 processes the samples from the ADC 1404. The quadrature demodulation processing logic 1402 operates like the quadrature demodulation processing logic 202 of FIG. 2 to generate an amplitude 1409 and a phase 1411. A compensation algorithm 1460 uses the amplitude 1409 and the phase 1411 to control the baseliner circuit 1408. The baseliner circuit 1408 includes a sigma-delta modulator and a digital sinewave source in at least one embodiment. The compensation algorithm 1460 can control an amplitude and a phase of the digital sinewave source to adjust the compensation signal 1403.

In at least one embodiment, the inductive sensor 1406 can operate at a frequency range of 50 . . . 100 kHz. It is possible to move to higher frequencies by driving a small value inductor (e.g., PCB-based inductor) at the very high frequency (e.g., 10 MHz), demodulating the inductor's AC, and sensing the vibrations at the lower frequency (e.g., an ADC sample rate of 100 kHz). An example of a PCB-based inductor is illustrated in FIG. 15.

Figure 15:
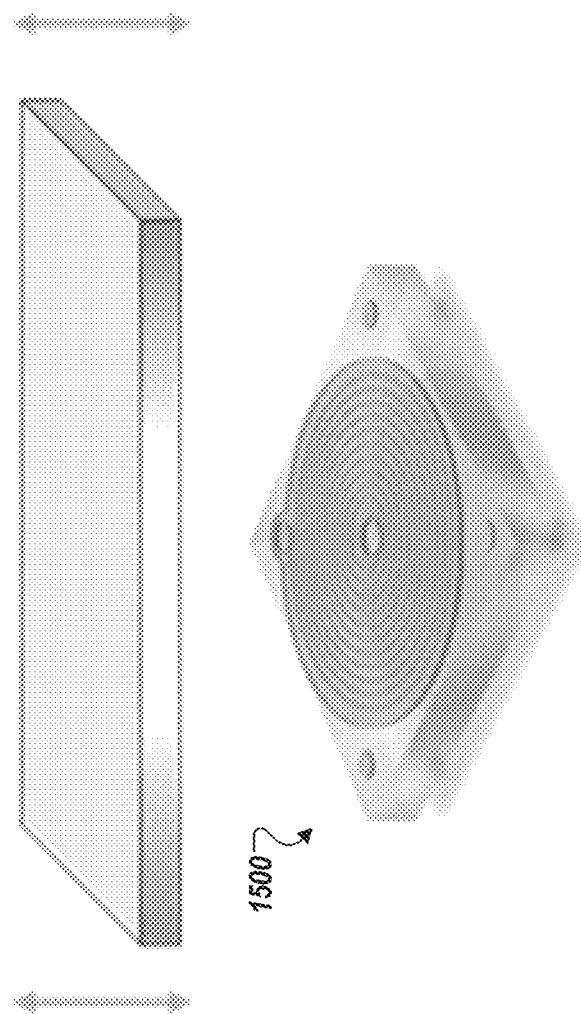
FIG. 15 illustrates an inductive displacement sensor with a planar inductor according to at least one embodiment.

FIG. 15 illustrates an inductive displacement sensor 1500 with a planar inductor according to at least one embodiment.

As described above, the inductive displacement sensor 1500 can be used in connection with an RX sensing channel with quadrature demodulation and compensation as described herein.

Figure 16:
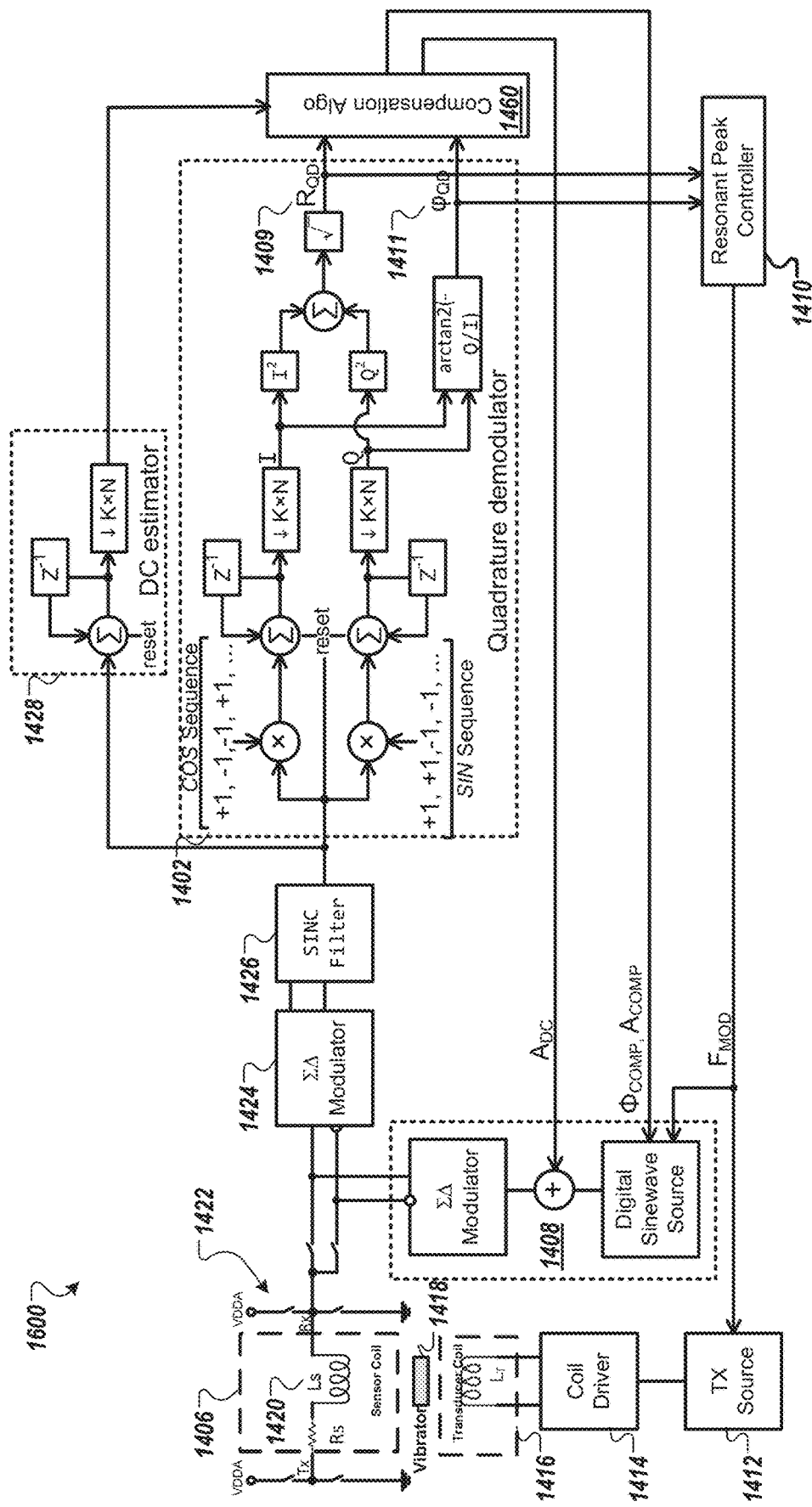
FIG. 16 is a high-frequency inductive vibration sensor with quadrature demodulation and a differential sigma-delta modulator as an analog-to-digital converter (ADC) according to at least one embodiment.

FIG. 16 is a high-frequency inductive vibration sensor 1600 with quadrature demodulation and a differential sigma-delta modulator as an analog-to-digital converter (ADC) according to at least one embodiment. The high-frequency inductive vibration sensor 1600 includes the baseliner circuit 1408, the sensor 1406, the quadrature demodulation processing logic 1402, and the compensation algorithm 1460, as described above with respect to FIG. 14. The high-frequency inductive vibration sensor 1600 includes a resonant peak controller 1410 to keep vibrating mechanical system (e.g., vibrating pipe) at its resonating frequency, a TX source 1412, a TX coil driver 1414 with a TX coil 1416 to vibrate a vibrator 1418 of a mechanical system. A receiver (RX) coil 1420 of the inductive sensor 1406 can be coupled to demodulation switches 1422 (on both sides of the RX coil 1420. The demodulation switches 1422 convert the pulsed high-frequency carrier inductor AC to the amplitude modulated current pulses. An ADC, such as a differential sigma-delta modulator 1424 and sinc filter 1426, samples the differential signals similarly as described herein. The quadrature demodulation processing logic 1402 processes the samples as described herein to obtain an amplitude 1409 and a phase 1411 that is provided to the compensation algorithm 1460 and the resonant peak controller 1410.

The high-frequency inductive vibration sensor 1600 includes a DC estimator 1428. The DC estimator 1428 estimates the constant/non-informative inductance (e.g., due to the vibrating pipe changing only 10% of the inductive sensor inductance) and tells the compensation algorithm 1460 how to adjust the DC level of the compensation signal to remove it. The baseliner circuit 1408 is similar to the embodiments described above, except it can generate a programmable amplitude and a phase AC signal with a programmable DC offset.

Figure 17:
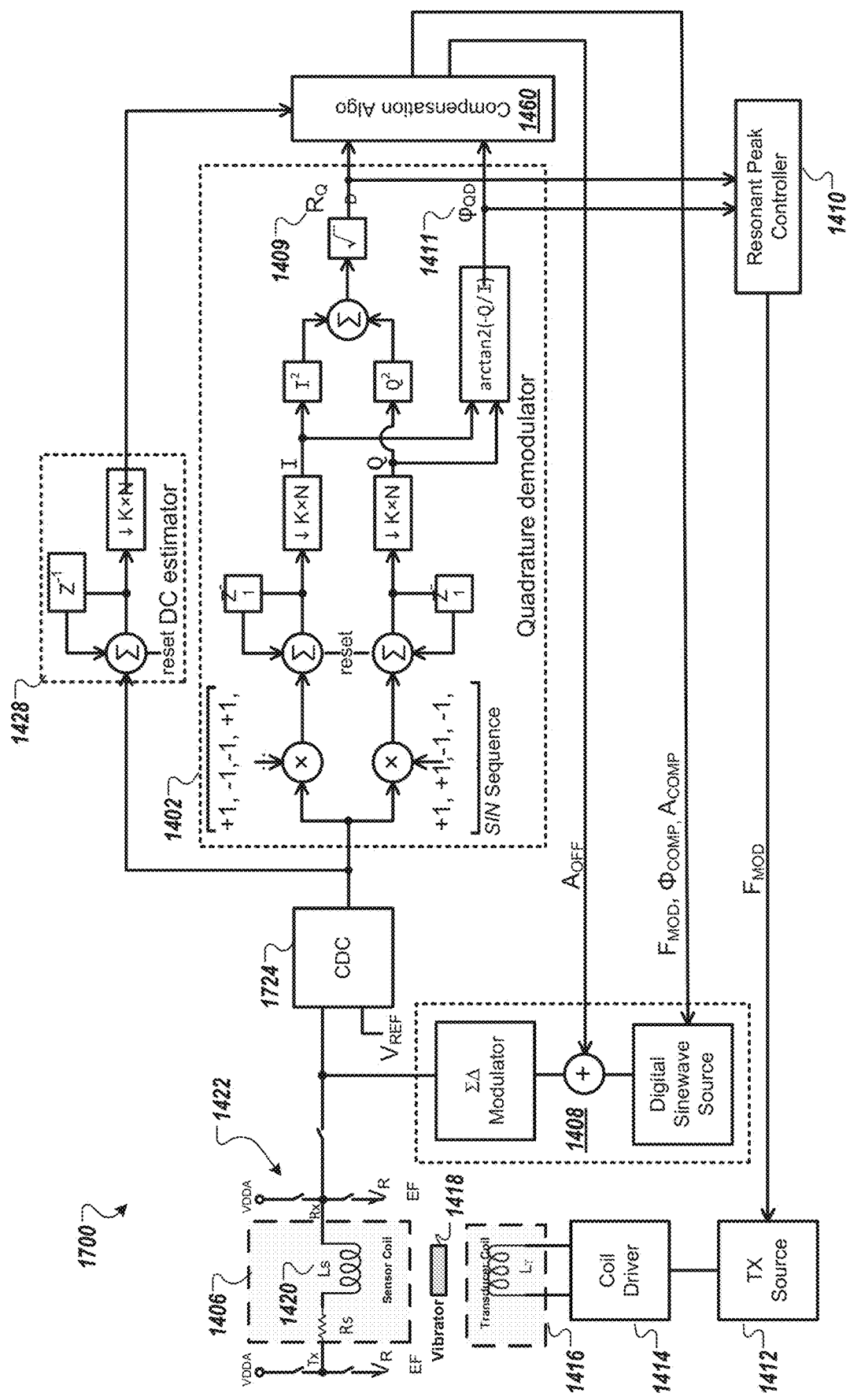
FIG. 17 is a high-frequency inductive vibration sensor with quadrature demodulation and a charge-to-digital (CDC) converter as an analog-to-digital converter (ADC) according to at least one embodiment.

FIG. 17 is a high-frequency inductive vibration sensor 1700 with quadrature demodulation and a charge-to-digital (CDC) converter as an analog-to-digital converter (ADC) according to at least one embodiment. The high-frequency inductive vibration sensor 1700 is similar to the high-frequency inductive vibration sensor 1600, except instead of a sigma-delta modulator and sinc filter, a CDC 1724 is used to sample the signal.

Figure 18:
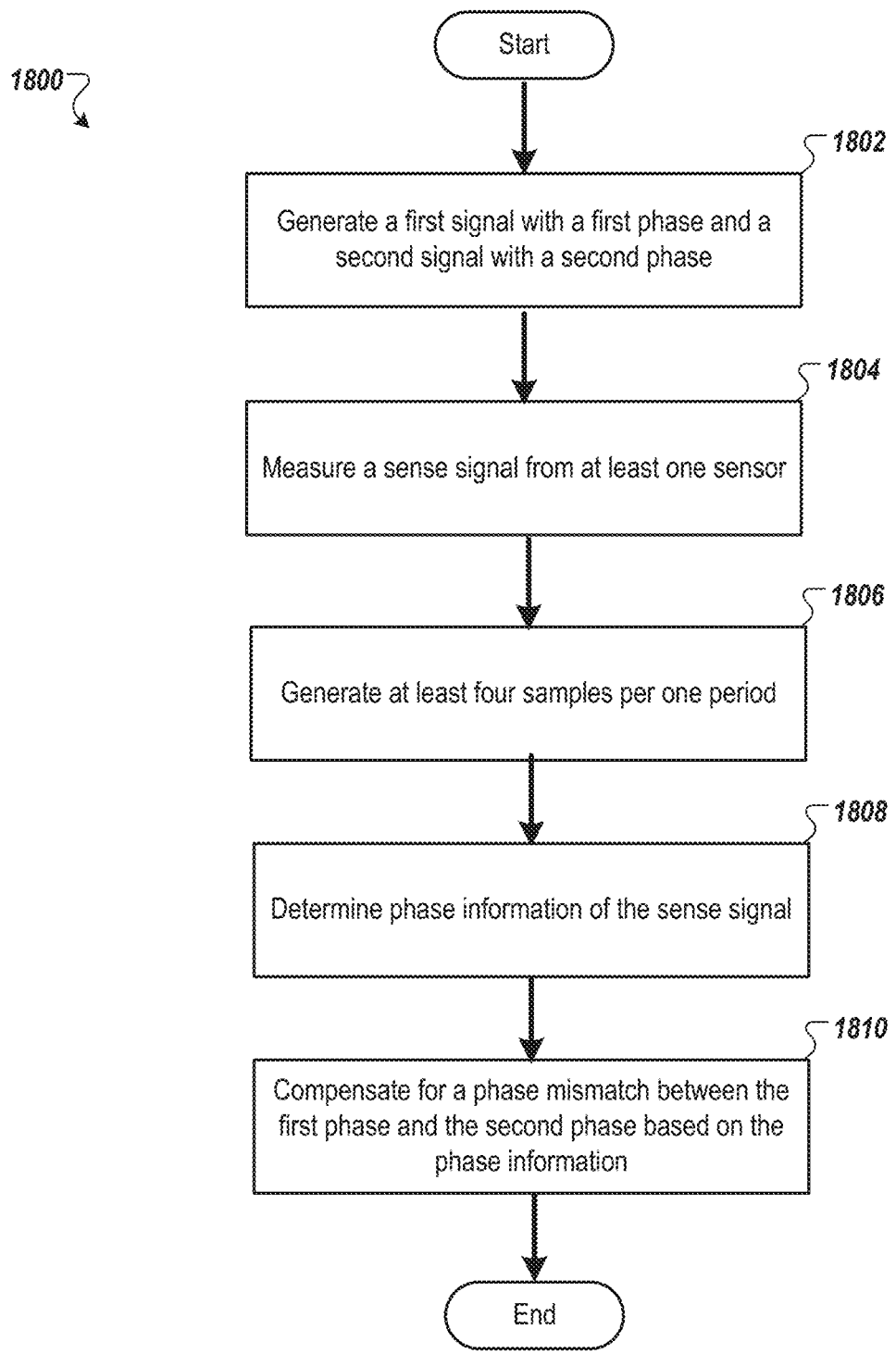
FIG. 18 is a flow diagram of a method of touch sensing with quadrature demodulation according to at least one embodiment.

FIG. 18 is a flow diagram of a method 1800 of touch sensing with quadrature demodulation according to at least one embodiment. In some embodiments, processing logic may perform the method 1800. The processing logic may include hardware, software, or any combination thereof. In one embodiment, compensation logic 116 of FIG. 1 performs the method 1800. In another embodiment, the touch controller 100 of FIG. 1 performs the method 1800. Alternatively, other components may be used to perform some or all of the operations of method 1800.

Referring to FIG. 18, the processing logic begins the method 1800 by generating a first signal comprising a first phase and generating a second signal comprising a second phase (block 1802). The processing logic receives a sense signal from at least one sensor (block 1804). The processing logic generates at least four samples per one period of the sense signal (1806). The processing logic determines phase information of the sense signal (block 1808). The processing logic compensates for a phase mismatch between the first phase and the second phase based on the phase information (block 1810), and the method 1800 ends.

In a further embodiment, the first signal is an excitation signal from an excitation source and the second signal is a shield signal from a shield source, as described herein. The processing logic compensates at block 1810 by adjusting at least the shield signal to maintain a constant phase difference between the excitation signal and the shield signal over multiple scan cycles. In another embodiment, the first signal is an excitation signal from an excitation source and the second signal is a baseline signal from a baseline circuit. The processing logic compensate at block 1810 by adjusting at least the baseline signal to maintain a constant phase difference between the excitation signal and the baseline signal over multiple scan cycles.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from the actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "applying," "coupling," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details, such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A touch controller comprising:
   one or more receiver sensing channels to measure a sense signal and generate at least four samples per one period of the sense signal;
   quadrature demodulation logic coupled to the one or more receiver sensing channels, the quadrature demodulation logic to generate in-phase and quadrature (IQ) samples using the at least four samples and determine phase information of the sense signal based on the IQ samples; and
   processing logic coupled to the quadrature demodulation logic, the processing logic to execute a compensation algorithm to compensate for a phase mismatch of the touch controller based on the phase information.

2. The touch controller of claim 1, further comprising:
   a shield source to generate a shield signal, wherein the shield source is to receive a compensation signal from the processing logic to adjust at least one of an amplitude or a phase of the shield signal generated by the shield source based on the phase information;
   a shield driver to receive the shield signal and drive the shield signal;
   a multiplexer coupled to the one or more receiver sensing channels and the shield driver; and
   an excitation source to generate the sense signal used by the one or more receiver sensing channels.

3. The touch controller of claim 2, wherein the compensation signal is to maintain a constant phase difference between the shield signal and the sense signal.

4. The touch controller of claim 1, further comprising:
   a baseliner circuit coupled to the one or more receiver sensing channels, wherein the baseliner circuit is to receive a compensation signal from the processing logic to adjust at least one of an amplitude or a phase of a baseline signal generated by the baseline circuit based on the phase information;
   a multiplexer coupled to the one or more receiver sensing channels; and
   an excitation source to generate the sense signal used by the one or more receiver sensing channels.

5. The touch controller of claim 4, wherein the baseliner circuit comprises:
   a sigma-delta modulator; and
   a digital sinewave source coupled to the sigma-delta modulator, wherein the digital sinewave source is to receive the compensation signal to adjust the sigma-delta modulator to generate the baseline signal.

6. The touch controller of claim 4, wherein the compensation signal is to maintain a constant phase difference between the baseline signal and the sense signal.

7. The touch controller of claim 4, further comprising:
   a shield source to generate a shield signal, wherein the shield source is to receive a second compensation signal from the processing logic to adjust at least one of an amplitude or a phase of the shield signal generated by the shield source based on sensing channel readings of at least one phase or amplitude information; and a shield driver to receive the shield signal and drive the shield signal.

8. The touch controller of claim 7, wherein the sense signal, the shield signal, and the baseline signal comprises a same frequency, wherein the compensation signal is to maintain a constant phase difference between the baseline signal and the sense signal, and wherein the second compensation signal is to maintain a constant phase difference between the shield signal and the sense signal.

9. The touch controller of claim 1, wherein the one or more receiver sensing channels comprises an analog-to-digital converter (ADC).

10. The touch controller of claim 1, wherein the one or more receiver sensing channels comprises a sigma-delta modulator and a sinc filter.

11. A method comprising:
generating a first signal comprising a first phase;
generating a second signal comprising a second phase;
measuring a sense signal from at least one sensor;
generating at least four samples per one period of the sense signal;
generating in-phase and quadrature (IQ) samples using the at least four samples;
determining phase and amplitude information of the sense signal based on the IQ samples; and
compensating for a phase and amplitude mismatches between the first signal and the second signal based on the phase and amplitude information.

12. The method of claim 11, wherein the first signal is an excitation signal from an excitation source and the second signal is a shield signal from a shield source, wherein the compensating comprises adjusting at least one of the phase or amplitude of the shield signal to maintain sensing channel readings of amplitude and phase within desired range.

13. The method of claim 11, wherein the first signal is an excitation signal from an excitation source and the second signal is a baseline signal from a baseline circuit, wherein the compensating comprises adjusting at least the baseline signal to maintain sensing channel readings amplitude and phase to desired values over multiple scan cycles.

14. A system comprising:
a sensor; and
a processing device coupled to the sensor, wherein the processing device comprises:
one or more receiver sensing channels to measure a sense signal and generate at least four samples per one period of the sense signal;
quadrature demodulation logic coupled to the one or more receiver sensing channels, the quadrature demodulation logic to generate in-phase and quadrature (IQ) samples using the at least four samples and determine phase information of the sense signal based on the IQ samples; and
processing logic coupled to the quadrature demodulation logic, the processing logic to execute a compensation algorithm to calibrate at least one phase or amplitude mismatch of the processing device.

15. The system of claim 14, wherein the sensor is a capacitive touch sensor.

16. The system of claim 15, wherein the one or more receiver sensing channels comprises an analog-to-digital converter (ADC).

17. The system of claim 15, wherein the one or more receiver sensing channels comprises a sigma-delta modulator and a sinc filter.

18. The system of claim 14, wherein the sensor is an inductive sensor.

19. The system of claim 18, further comprising:
a baseliner circuit coupled to the inductive sensor and the one or more receiver sensing channels, wherein the inductive sensor comprises a sensor coil and demodulation switches;
a resonant peak controller;
a transmit (TX) source coupled to the resonant peak controller;
a coil driver coupled to the TX source; and
a direct current (DC) estimator.

20. The system of claim 19, wherein the baseliner circuit comprises a first sigma-delta modulator and a digital sinewave source, wherein the one or more receiver sensing channels comprises a second sigma-delta modulator and a sinc filter.

* * * * *